(12) United States Patent
Schneider

(10) Patent No.: US 10,527,021 B2
(45) Date of Patent: Jan. 7, 2020

(54) HYDRAULIC TURBINE

(71) Applicant: Natel Energy, Inc., Alameda, CA (US)

(72) Inventor: Abraham D. Schneider, San Francisco, CA (US)

(73) Assignee: Natel Energy, Inc., Alameda, CA (US)

( * ) Notice: Subject to any disclaimer, the term of this patent is extended or adjusted under 35 U.S.C. 154(b) by 595 days.

(21) Appl. No.: 15/149,984

(22) Filed: May 9, 2016

(65) Prior Publication Data

US 2016/0327011 A1 Nov. 10, 2016

Related U.S. Application Data

(60) Provisional application No. 62/158,170, filed on May 7, 2015.

(51) Int. Cl.
| | | |
|---|---|---|
| *F03B 7/00* | (2006.01) | |
| *F03B 11/02* | (2006.01) | |
| *F03B 11/06* | (2006.01) | |
| *F03B 13/10* | (2006.01) | |
| *F03B 3/04* | (2006.01) | |
| *F03B 1/04* | (2006.01) | |

(Continued)

(52) U.S. Cl.
CPC ............ *F03B 1/04* (2013.01); *F03B 1/02* (2013.01); *F03B 7/006* (2013.01); *F03B 11/004* (2013.01); *F03B 11/02* (2013.01); *F05B 2220/32* (2013.01); *F05B 2240/12* (2013.01); *F05B 2240/123* (2013.01); *F05B 2240/1231* (2013.01); *F05B 2240/13* (2013.01); *F05B 2240/244* (2013.01); *Y02E 10/223* (2013.01); *Y02E 10/226* (2013.01); *Y02E 10/28* (2013.01)

(58) Field of Classification Search
CPC ...... F03B 1/02; F03B 1/04; F03B 3/04; F03B 7/006; F03B 11/004; F03B 11/02; F03B 11/06; F03B 13/10; F05B 2220/32; F05B 2240/12; F05B 2240/1231; F05B 2240/13; F05B 2240/123; Y02E 10/223; Y02E 10/226; Y02E 10/28
See application file for complete search history.

(56) References Cited

U.S. PATENT DOCUMENTS

| | | | | |
|---|---|---|---|---|
| 206,289 A | * | 7/1878 | Alger | ...................... F03B 7/006 |
| | | | | 415/5 |
| 231,129 A | | 8/1880 | Wiesebrock | |

(Continued)

FOREIGN PATENT DOCUMENTS

| | | |
|---|---|---|
| CN | 102076956 A | 5/2011 |
| CN | 201874722 U | 6/2011 |

(Continued)

OTHER PUBLICATIONS

International Search Report for International Application No. PCT/US16/31489 dated Aug. 17, 2016, 3 pgs.

(Continued)

*Primary Examiner* — Igor Kershteyn
(74) *Attorney, Agent, or Firm* — Sterne, Kessler, Goldstein & Fox P.L.L.C.

(57) ABSTRACT

Disclosed herein are linear hydraulic turbines in which the linear machine converts the majority of available energy in the flowing water into useful torque directly in the runner, leaving the outflow with very little velocity.

21 Claims, 16 Drawing Sheets

(51) Int. Cl.
  *F03B 1/02* (2006.01)
  *F03B 11/00* (2006.01)

(56) References Cited

U.S. PATENT DOCUMENTS

| | | | | |
|---|---|---|---|---|
| 685,016 | A | * | 10/1901 | Towsley ............... F03B 17/064 415/5 |
| 849,311 | A | | 4/1907 | Auld |
| 929,198 | A | | 7/1909 | Doble et al. |
| 1,481,397 | A | * | 1/1924 | Tetetleni ............... F03B 17/06 415/125 |
| 3,270,805 | A | * | 9/1966 | Glucksman ............ F04D 33/00 165/122 |
| 3,659,698 | A | | 5/1972 | Helmut |
| 4,049,300 | A | * | 9/1977 | Schneider ............... F03D 3/04 290/54 |
| 4,350,474 | A | * | 9/1982 | Murphy ............. F03B 13/1835 415/5 |
| 4,355,949 | A | | 10/1982 | Bailey |
| 4,494,008 | A | | 1/1985 | Patton |
| 4,563,168 | A | * | 1/1986 | Schneider ............ F03B 17/062 474/207 |
| 4,579,506 | A | | 4/1986 | Ossberger |
| 4,642,022 | A | | 2/1987 | Rydz |
| 4,978,071 | A | | 12/1990 | MacLean et al. |
| 6,435,827 | B1 | | 8/2002 | Steiner |
| 7,645,115 | B2 | | 1/2010 | Schneider et al. |
| 7,744,340 | B2 | | 6/2010 | Levin et al. |
| 2007/0231129 | A1 | | 10/2007 | Schneider et al. |
| 2009/0028689 | A1 | | 1/2009 | Levin et al. |
| 2011/0221200 | A1 | | 9/2011 | Gokhman |
| 2012/0248787 | A1 | | 10/2012 | Reist |
| 2017/0204830 | A1 | | 7/2017 | Schneider |

FOREIGN PATENT DOCUMENTS

| | | |
|---|---|---|
| DE | 388530 C | 1/1924 |
| EP | 1 260 708 A1 | 11/2002 |
| JP | H01280683 A | 11/1989 |
| KR | 20120110072 A | 10/2012 |
| WO | WO 2013/013328 A1 | 1/2013 |

OTHER PUBLICATIONS

International Search Report for International Patent Application No. PCT/US2017/043803, European Patent Office, Rijswijk, Netherlands, dated Dec. 13, 2017.
Written Opinion of the International Searching Authority for International Patent Application No. PCT/US2017/043803, European Patent Office, Munich, Germany, dated Dec. 13, 2017.

* cited by examiner

HYDRAULIC TURBINE

CROSS-REFERENCE TO RELATED APPLICATION

This application claims the benefit of U.S. Provisional Patent Application No. 62/158,170, filed May 7, 2015, which is incorporated herein by reference in its entirety.

BACKGROUND

Cross-flow turbines with circular cross-section are commonly known and have been widely used in hydropower applications around the world for many decades.

This type of turbine operates on a free-jet principle, utilizing a nozzle to direct high velocity fluid flow through a runner. This runner can consist of multiple blades of circular arc section arrayed about a single axis, comprising in their entirety a cylindrical shape. Water flows through the cylinder in a direction perpendicular to the cylinder axis, so that the fluid performs work on two different areas of the circumferential blades. By design, this type of turbine extracts most of the kinetic energy in the flowing water within the two stages of the turbine, and because the exhausted water has little remaining velocity, this kind of turbine does not require a draft tube to ensure high conversion efficiency. Draft tubes can be utilized on some vertical-outflow cross-flow type turbines, to allow a suction effect and enable capture of the full gross head of a hydropower plant.

Circular cross-flow turbines have a number of advantages and benefits compared to other turbines, such as Francis turbines. Circular cross-flow turbines are capable of maintaining a relatively high efficiency over a wide range of flow rates, something that Francis turbines cannot do. The cross-flow runner is self-cleaning, because the leading edge of the first stage becomes the trailing edge in the second stage. Most cross-flow turbines are designed with bearings outside the water path, reducing the risk of environmental contamination.

However, circular cross-flow turbines have a number of limitations. Their efficiency, peaking between 70%-85% depending on the design and care taken in manufacture, is lower than conventional reaction turbines such as Kaplan or Francis turbines, as well as other impulse turbines such as Pelton turbines, all of which can attain efficiency greater than 90%. Circular cross-flow units suffer lower efficiency due to several causes. Only a small fraction of the circular cross-flow runner circumference is actually usable as cross-flow area. A significant fraction of the flow through the runner becomes entrained in the blades and is exhausted without fully contributing to the turbine's shaft work. Additionally, in theory the flow streamlines crossing through the runner between stages must actually cross each other, and under some conditions, this stream impacts the central axle or shaft, causing additional losses. Furthermore, most practical cross-flow runners require multiple support ribs along the length of the blade. Each of these ribs creates areas of local turbulence and efficiency loss.

The form factor of a circular cross-flow turbine is such that the runner diameter is strongly related to the unit's flow capacity, and thus the unit's power rating. Because the runner diameter is directly related to the shaft speed, there is a limit to the practical size, and thus flow rate, of this type of unit. Typical cross-flow turbine shaft speeds are relatively slow, especially for large-flow units at low head. Cross-flow turbines are intolerant of being operated if the runner comes into contact with the lower water level. At many low head sites, the tail water level can vary substantially (by several meters), leading to difficult plant design with this kind of turbine.

In addition to the common circular cross-flow turbine, a variety of linear crossing-flow machines are known. In the device disclosed in U.S. Pat. No. 7,645,115, flow passes through two stages of blades in a direction perpendicular both to the blades' path of travel, as well as to the axes of the two parallel axles supporting the drive belts or chains. The blades in U.S. Pat. No. 7,645,115 are designed such that their curvature is symmetric about the path of travel, unlike the design of the current invention. The reaction force on the blades in U.S. Pat. No. 7,645,115 is ideally in-line with the path of blade travel, but under certain operating conditions, such as when not operated at the optimal blade-to-water speed ratio, substantial drag loads perpendicular to the path of blade travel can force the moving blades inwards towards the array of stationary guidevanes. To prevent damage from collision due to unwanted inward deflections, the drive belts in this kind of linear turbine must be highly tensioned. This tension exceeds the minimum required tension for normal power transmission, reduces powertrain life, and imposes additional stress on the machine.

Hydropower plants must be designed to operate safely even if the utility grid connection is lost. Normally, in the event of power loss, the turbines must be quickly shut down to prevent risk of damage due to high speed operation. High-flow turbines, such as Kaplan, bulb, circular crossflow, or Francis turbines, are subject to large pressure fluctuations (known as water hammer), if the turbine is suddenly turned off, or if a grid-disconnect event occurs and the machine rapidly accelerates. This is because all the water flowing through these types of turbines must be stopped, to fully depower the turbine. Pelton turbines, used only at sites having very high pressure, benefit by being able to use a jet deflector plate to divert the water stream away from the turbine in an emergency, which allows fast and safe shutdown without water hammer, because only the direction of flow is changed, not the rate of flow.

SUMMARY OF THE INVENTION

The present invention relates to conversion of kinetic energy of a flowing fluid into shaft work, and in particular, to an improved system, method, and apparatus for a linear hydraulic cross-flow turbine. This new turbine retains some of the best characteristics of conventional free jet cross-flow turbines, including high efficiency over a wide range of flow rates and self-cleaning operation, while providing significant improvements in specific speed, efficiency, and design freedom enabling lower-cost civil works, especially at low head hydropower projects.

In one aspect of the invention, a turbine having two working stages in which the turbine blades move in substantially linear paths around a central array of stationary guidevanes, is provided with blades which have negative stagger angle in the first path, and positive stagger in the second path. This type of turbine results in efficient operation with the benefit of hydraulic forces that inherently support the blades in their path, avoiding risk of collision between the blades and stationary guidevanes without the need for complex support mechanisms.

In another aspect of the invention, a turbine having two working stages in which the turbine blades move in substantially linear paths around a central array of stationary guidevanes, is operated as a free-jet hydraulic turbine. In this machine, the working fluid, such as water, enters the turbine as a free jet surrounded by an atmosphere of substantially lower density, such as air.

The disclosed design has numerous comparative benefits in comparison to conventional high-flow hydraulic turbines including circular cross-flow turbines and Kaplan turbines. In comparison to the common circular cross-flow, the disclosed design effectively maximizes the "working zone" in the turbine. Instead of a narrow portion of the circumference of the circular runner which is used for crossing flow, the linear cross-flow has a long zone of cross-flow. Also this crossing flow can be well-conditioned with little turbulence, while in a circular cross-flow turbine the theoretical flow path actually crosses through itself, and also may collide with the necessary drive shaft, creating additional losses. Furthermore, a significant fraction of the flow in a circular cross-flow turbine becomes "entrained" in the vanes circumferentially, contributing to a loss in performance. The portion of entrained flow in the linear cross-flow is minimized in comparison to the working (linear) portion. As a consequence the maximum efficiency of the present design can be higher than real-world circular cross-flow turbines. There are a number of other important advantages, such as the fact that the disclosed invention can be built with a true free-jet nozzle, which allows the use of a jet deflector plate similar in concept to the design commonly deployed in Pelton turbines. This jet deflector can allow instantaneous de-powering of the turbine in the event of grid fault, preventing runaway while preventing any water hammer or surge. These types of surge loads often are so large that they drive the design of the penstock and other pipeline equipment. By being able to be configured with a deflector, the linear cross-flow can significantly reduce the total cost of hydropower plants.

In another aspect of this invention, the cross-sectional area of the free jet is adjusted, allowing flow rate and power of the turbine to be modulated, with only small impact on turbine efficiency.

In one aspect of the invention, a turbine includes a plurality of blades configured to travel a path around a first axis and a second axis parallel to the first axis. The path can include a first segment from the second axis to the first axis, the first segment being a first stage of the turbine, a second segment around the first axis, a third segment from the first axis to the second axis, the third segment being a second stage of the turbine, and a fourth segment around the second axis. Each of the plurality of blades can have an orientation relative to a vector of blade travel resulting in a blade negative stagger angle in the first stage of the turbine, and a blade positive stagger angle in the second stage of the turbine. In another aspect, the first segment can be substantially linear, the second segment can be substantially arc-shaped, the third segment can be substantially linear, and the fourth segment can be substantially arc-shaped. The first axis and the second axis can be spaced along a horizontal plane. In another aspect, The first axis and the second axis can be spaced along a vertical plane.

In a further aspect, a turbine can include a plurality of blades attached to a structure and traveling a path comprising a first stage substantially linear portion, a first substantially arc-shaped portion, a second stage substantially linear portion, and a second substantially arc-shaped portion. The turbine can include a plurality of stationary guide vanes arranged in a space enclosed by the structure and a shroud positioned adjacent to the first substantially arc-shaped portion and conforming to a curvature of the first substantially arc-shaped portion.

The turbine can be configured to receive a free jet working fluid having a flow pattern through the turbine in a plane substantially perpendicular to the first stage and the second stage. The free jet working fluid can enter the turbine at an angle less than or equal to 45 degrees with respect to a line of blade travel in the first stage. In another aspect, a maximum absolute velocity of the free jet working fluid can occur prior to entering the first stage. The plurality of blades at the first stage and the second stage can be configured to engage the free jet working fluid in an impact-free manner. The flow path of the free jet working fluid leaving the second stage can exit in a direction substantially perpendicular to a line of travel of the second stage of blades.

The turbine can include a movable structure configured to have a deflection position and a non-deflection position. When the movable structure is in the deflection position, the movable structure can redirect the free jet working fluid away from the plurality of blades.

The shroud can have a first end positioned at a location approximately equal to a beginning of the first substantially arc-shaped portion, and a second end positioned at a location approximately coincident with a trailing edge of a first interior guide vane.

The turbine can have a clearance between tips of the plurality of blades moving around the second arc-shaped path and a closest stationary wall of at least approximately one blade chord length.

A turbine system can include a turbine having a plurality of blades attached to a structure and traveling a path comprising a first stage substantially linear portion, a first substantially arc-shaped portion, a second stage substantially linear portion, and a second substantially arc-shaped portion. The turbine can include a plurality of stationary guide vanes arranged in a space enclosed by the structure and a shroud positioned adjacent to the first substantially arc-shaped portion and conforming to a curvature of the first substantially arc-shaped portion. The turbine system can include a confined flow nozzle having a rectangular cross-section. The confined flow nozzle can be configured to provide a free jet working fluid to the turbine having a flow pattern through the turbine in a plane substantially perpendicular to the first stage and the second stage.

The confined flow nozzle can include two opposing movable panels configured to vary a cross-sectional area of the free jet working fluid. An orientation of the panels can result in a free jet working fluid that varies substantially in its width, but whose cross-section is substantially unaltered. The free jet working fluid can intersect the plurality of blades in substantially the same manner regardless of the width of the jet. An orientation of the panels in the turbine system can result in a free jet working fluid that substantially maintains its width, but whose cross-section height varies.

In another aspect, the turbine can be configured to receive a free jet working fluid exits from an open channel sluice.

In a further aspect, the turbine can be enclosed by a chamber that is sealed. The chamber can have a control valve. The free jet working fluid can leave the second stage of the turbine and exit the chamber through a draft chamber having an outlet that is hydraulically sealed to an outlet fluid body. Movement of the free jet working fluid through an enclosed air space in the chamber can entrain bubbles of the surrounding atmosphere. Momentum of the free jet working fluid can evacuate the entrained bubbles of the surrounding atmosphere from the chamber. The control valve can be configured to allow an amount of air to enter the chamber to maintain a desired elevation of suction head inside the draft chamber without allowing the outlet fluid body to contact the plurality of blades.

In another aspect, each of the plurality of blades can be connected at a first end to a moving structure and at a second end to a second moving structure to travel the path. The moving structure and the second moving structure can be belts.

In a further aspect, each of the plurality of blades can be connected to a moving structure at its mid-span, such that the ends of each blade are cantilevered.

PARTS LIST

Figure 1:
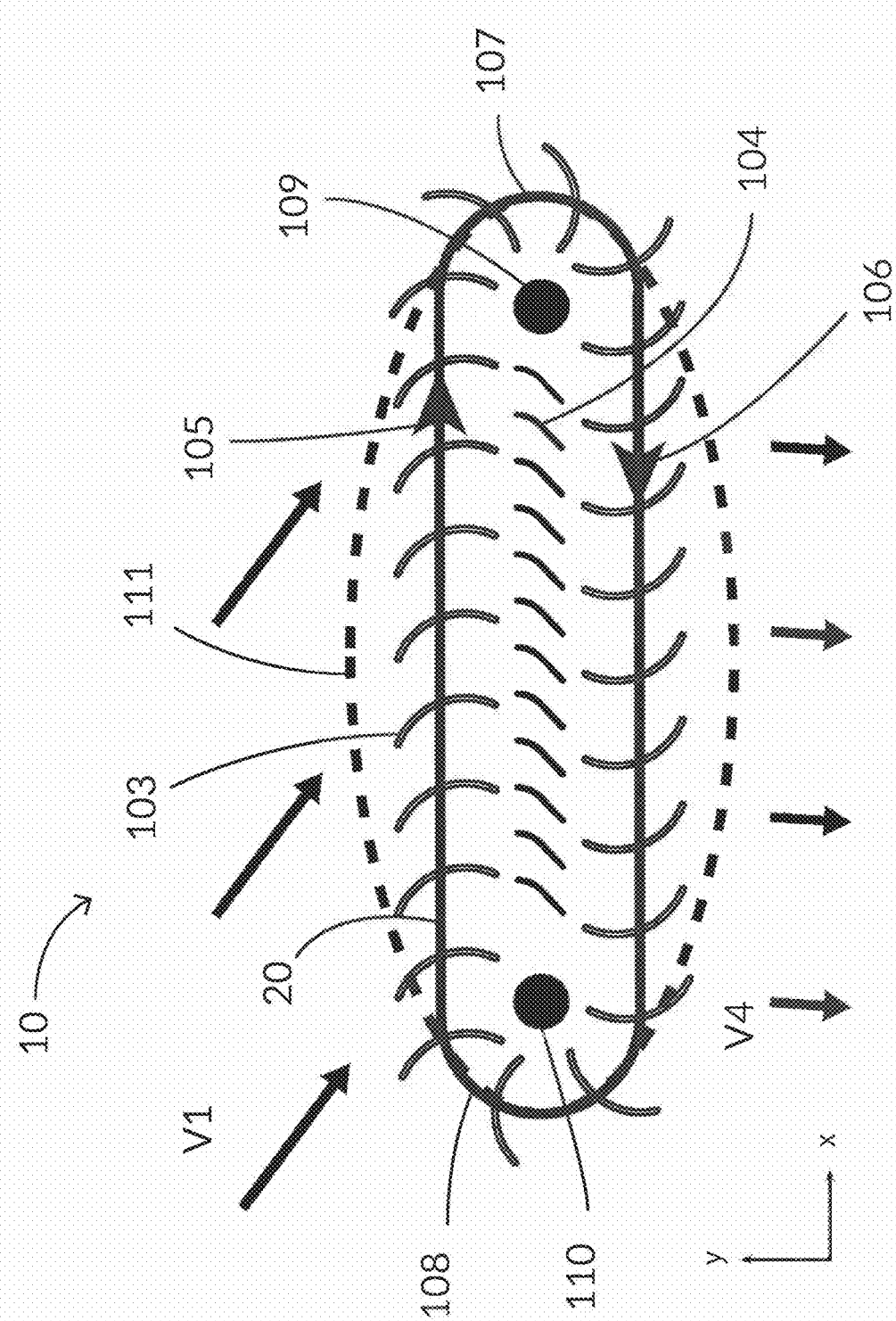
FIG. 1 is a schematic cross-sectional view of a turbine according to various aspects of the invention.

10 Turbine
103 Blade
104 Guidevane
105 First linear path
106 Second linear path
107 First circular path
108 Second circular path
109 First axis
110 Second axis
111 Blade path $\alpha 1$ Flow angle at inlet to first blade stage
$\alpha 2$ Flow angle at inlet to second blade stage
$\lambda 1$ Stagger angle; angle between chord line and axial direction
$\lambda 2$ Stagger angle
$\theta 1$ Pitch angle of first stage blade
$\theta 2$ Pitch angle of second stage blade
B1 First stage blade cascade
B2 Second stage blade cascade
F1 Hydraulic force on first-stage blade
F1$u$ Component of force in direction of blade travel
F1$n$ Component of force perpendicular to direction of blade travel
F2 Hydraulic force on second-stage blade
F2$u$ Component of force in direction of blade travel
F2$n$ Component of force perpendicular to direction of blade travel
GV2 Second stage guidevane cascade
Hjet Jet cross-sectional height
U1 Blade linear velocity
U2 Blade linear velocity; equal in magnitude to U1
V1 Incoming absolute velocity of working fluid
V2 Absolute velocity at blade outlet
V3 Absolute velocity at guidevane outlet
V4 Outlet absolute velocity of working fluid
Wjet Jet cross-sectional width
W1 Relative velocity at blade inlet
W2 Relative velocity at blade outlet
W3 Relative velocity at blade inlet
W4 Relative velocity at blade outlet
201 Axial flow direction
202 Blade camber line
203 Guidevane camber line
204 Streamline of working fluid
301 Free jet of working fluid
302 Ambient atmosphere
303 Shroud
304 Axle shroud
305 Axle fairing
306 Second axis
401 Jet deflector plate
402 Jet deflector plate pivot
403 Jet deflector plate support
404 Deflected jet bypassing turbine
501 Spacing between axes of a short machine
502 Spacing between axes of a long machine
601 Nozzle
602 Air-tight housing
603 External ambient atmosphere
604 Enclosed atmosphere
605 Pool at higher elevation
606 Pool at lower elevation
607 Entrained air bubbles
608 Bubbles rising to surface
609 Suction head elevation
610 Gap between enclosed water level, and moving blades
611 Vacuum regulation air inlet
612 Gap between shroud and housing, for deflected jet to bypass turbine
613 Gap between housing and blades near nozzle outlet
614 Gross head (elevation difference between upper and lower pools)
615 Penstock or inlet pipe
700 Nozzle
701 Nozzle panel
702 Nozzle panel pivot 703 Nozzle housing wall
704 Nozzle panel in maximum-open position
705 Nozzle panel in closed position
706 Belts
800 Nozzle
801 Nozzle panel
802 Nozzle panel in closed position
900 Nozzle
901 Nozzle spear
902 Nozzle housing
1000 Nozzle
1001 Nozzle housing
1002 Nozzle panel
1003 Nozzle panel pivot
1101 Penstock pipe
1102 Penstock to nozzle adapter
1103 Nozzle
1104 Housing
1105 Plinth or draft chamber
1106 Outlet
1107 Air inlet
1108 Large power takeoff sprocket
1109 Small power takeoff sprocket
1110 Electrical generator

DETAILED DESCRIPTION

As shown in FIG. 1, a turbine 10 can include a first axis 109 and a second axis 110. First axis 109 and second axis 110 can be parallel. First axis 109 and second axis 110 can be spaced along a horizontal direction. In another aspect, first axis 109 and second axis 110 can be spaced along a vertical direction. In another aspect, first axis 109 and second axis 110 can be spaced along a plane at some angle relative to horizontal, between horizontal and vertical.

The turbine 10 can include blades 103 that can move in a path consisting of multiple segments between and around first axis 109 and second axis 110. For example, blades 103 can move through a first segment 105 from second axis 110 toward first axis 109, a second segment 107 around first axis 109, a third segment 106 from first axis 109 toward second axis 110, and a fourth segment 108 around second axis 110. After fourth segment 108, blades 103 can re-enter first segment 105. First segment 105 and third segment 106 can be substantially linear. Second segment 107 and fourth segment 108 can be substantially arc shaped.

The blades 103 can be constrained to travel in the path shape described above in numerous ways. For example the blades 103 can be supported by a belt, chain, or similar component which is arranged around pulleys or sprockets. Alternatively the blades 103 can be supported by a rail or similar guide.

Working fluid with high velocity V1 is directed into blades 103 moving through first segment 105. The velocity V1 can be approximately equal to the free-spouting velocity that would be attained given the available head across the turbine. For example $V1 \approx sqrt(2gH)$, where g is the constant acceleration due to gravity and H is the available head. The incoming flow is directed in an orientation perpendicular to the axes 109 and 110. The incoming flow is oriented at an acute angle with respect to the path of blade travel. After passing through first segment 105, the majority of working fluid flow passes across a linearly-arrayed cascade of guidevanes 104, positioned in between the trailing edge of the first segment 105, and the leading edge of third segment 106. These guidevanes 104 redirect flow to efficiently interact with the blades 103 traveling through third segment 106.

After performing work on blades 103 in third segment 106, the working fluid flow exits the turbine with reduced velocity V4.

Figure 2:
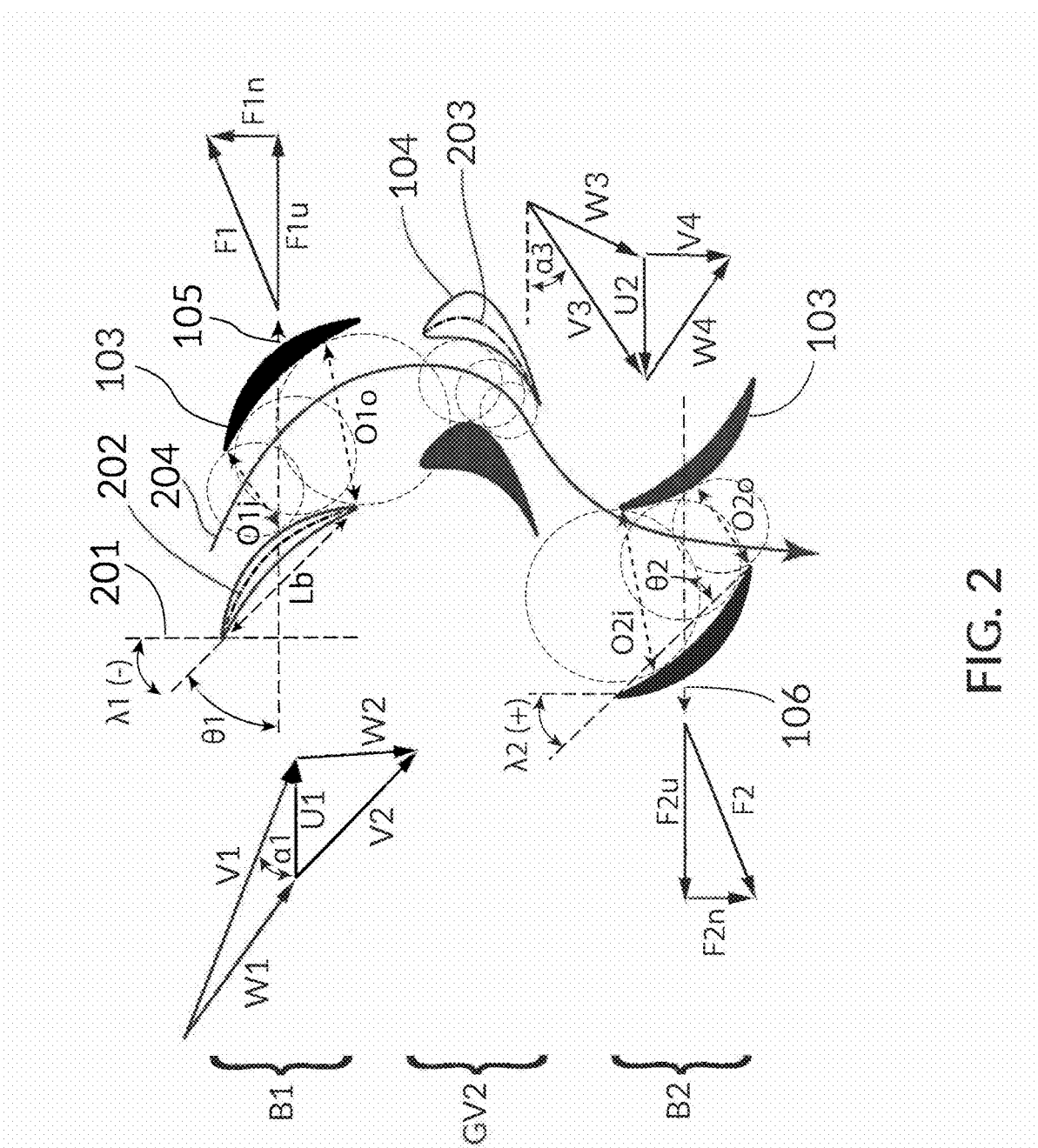
FIG. 2 is a detail schematic cross-sectional view of blade and guidevane cascades in a turbine, showing velocity triangles, forces, and a streamline through the turbine according to various aspects of the invention.

The stagger angle of blades 103 is the angle between the blade chord Lb and the axial-flow direction 201. As shown in FIGS. 1-2, blades 103 have a negative stagger angle $\lambda 1$ in first segment 105, and a positive stagger angle $\lambda 2$ in the third segment 106. Blades 103 can be constrained so that the stagger angle $\lambda 1$ is equal in magnitude, but opposite in sign, to $\lambda 2$. This is accomplished by maintaining a fixed pitch angle of blade chord Lb with respect to the direction of travel, such that the pitch angle $\theta 1$ in the first segment is the same as the pitch angle $\theta 2$ in the third segment.

FIG. 2 is a detailed schematic cross-sectional view of blade and guidevane cascades in a turbine 10, showing velocity triangles, forces, and a streamline of working fluid through the turbine.

The turbine has two stages. Travel of blades 103 along the first segment 105 represents a first stage B1 of turbine 10. Travel of blades 103 along the third segment 106 represents a second stage B2 of turbine 10. The cascade throat is defined as the minimum spacing between two adjacent blades at any point along the streamline. The first stage blade cascade inlet throat is O1$i$, and the first stage blade cascade outlet throat is O1$o$. The second stage blade cascade inlet throat is O2$i$, and the first stage blade cascade outlet throat is O2$o$.

The velocity triangles in FIG. 2 illustrate the fluid dynamic operation of this turbine design. The path taken through the cascade by the working fluid is illustrated by the streamline 204. The blade linear velocity is equal at all points along the blade path. Thus, the blade linear velocity U1 in the first segment 105 is equal to the blade linear velocity U2 in the third segment 106. When operated at its optimal speed, the turbine will result in the maximum possible extraction of kinetic energy, and thus the maximum possible difference between the inlet velocity V1 and the outlet velocity V4.

The blades 103 are preferably of a curved shape oriented such that the blade camber line 202 at the leading edge of a blade in the first stage B1 in first segment 105 is approximately tangent to the vector W1, and the blade camber line 202 at the trailing edge of this blade is approximately tangent to the vector W2.

The guidevanes 104 in guidevane cascade GV2 are preferably of a curved shape such that the guidevane camber line 203 at the leading edge is approximately tangent to the vector V2, and the guidevane camber line 203 at the trailing edge is oriented with respect to the second stage path of blade travel 106 at approximately the same angle $\alpha 1$, such that $\alpha 3 \approx \alpha 1$. In another aspect, $\alpha 3$ is slightly smaller than $\alpha 1$. For example, if $\alpha 1$ was 20 degrees, $\alpha 3$ might be 18 degrees. In another aspect, $\alpha 3$ is slightly larger than $\alpha 1$. For example, if $\alpha 1$ was 20 degrees, $\alpha 3$ might be 21 degrees. Preferably, the guidevanes are shaped in such a way that the throat through the guidevane cascade is continuously diminishing. In this manner, flow must continuously accelerate through the cascade. Such a shape will encourage flow to remain attached to the guidevanes and travel through the guidevane cascade GV2 with minimum loss of energy.

Numerous variations of inlet flow angle $\alpha 1$, blade shape, pitch angle $\theta$, and guidevane shape are possible, and effective designs may have a range of velocity reduction from inlet to outlet of 40% to 75%, with efficiency ranging from approximately 70% to 85%. In another aspect, device efficiency can be greater than approximately 85%. In general, designs having low values of $\alpha 1$ and blades having a large magnitude of pitch angle θ will result in larger values of velocity reduction and higher efficiency, but will allow less flow to pass through the turbine, producing less power, at a given pressure. Designs having larger values of α1 with smaller pitch angle θ will have lower magnitude of velocity reduction and may have reduced efficiency but will allow more flow to pass through the turbine, producing more power, at a given pressure. In an aspect of the invention, inlet flow angle α1 can range from approximately 10 degrees to approximately 45 degrees. Pitch angle θ can range from approximately 15 degrees to approximately 35 degrees.

As shown, the working fluid can have a slightly curved streamline 204 through first segment 105. In the first stage B1, blades 103 turn the flow of the working fluid due to their curvature. Because the size of the B1 blade cascade throat increases from the blade cascade inlet throat O1i to the blade cascade outlet throat O1o, diffusion of flow occurs. This behavior helps to reduce the fluid velocity within the first stage B1, resulting in useful extraction of work manifested as force on the moving blades. The first stage outflow velocity V2 of the working fluid is substantially smaller in magnitude than the inlet velocity V1, even though its direction is only changed slightly due to the vector addition of the blade linear velocity U1, and the blade relative velocity W1 and W2. For example, a turbine may experience a 25%-35% reduction in velocity from V1 to V2 within the first blade stage B1.

After passing through blades 103 in the first stage B1 in first segment 105, the working fluid can accelerate through the cascade GV2 of guidevanes 104, changing in speed and direction such that the velocity V3 efficiently interacts with blades 103 in the second stage B2 in third segment 106. The positive stagger angle λ2 of blades 103 in third segment 106, combined with their curvature, result in a converging cross-section. The fluid enters the second stage blades B2 with relative velocity W3 and leaves with relative velocity W4. Subtraction of the blade linear velocity results in the flow of working fluid exiting the turbine with velocity V4.

The orientation and shape of the blades result in reaction forces F1 in the first stage in segment 105, and F2 in the second stage in the third segment 106. The component of these forces oriented parallel to the blade travel, F1u and F2u, is used to extract useful work from the turbine, for example, by driving an electric generator mounted to a shaft concentric with axis 109.

Due to the orientation and shape of the blades 103, the perpendicular force components F1n and F2n are oriented away from the cascade of guidevanes 104 in both the first segment 105 and the third segment 106. This will cause the structure supporting the blades to deflect outwards in a shape similar to that of blade path 111. The shape of blade path 111 is exaggerated to illustrate the deflection direction. For a turbine in which the blades 103 are supported along the travel path by belts or chains, this outward deflection is beneficial to the turbine 10 because the blades 103 passively adopt a position in operation that is immune to collisions between the blades 103 themselves and any interior stationary components, such as the guidevanes 104.

In an aspect of the invention, the amount of work done in the first stage B1 of turbine 10 in first segment 105 can be nearly equivalent to the amount of work done in the second stage B2 of turbine 10 in third segment 106. A benefit of this is evenly distributed mechanical forces, and hence the optimal use of materials to accomplish the energy conversion function.

Figure 3:
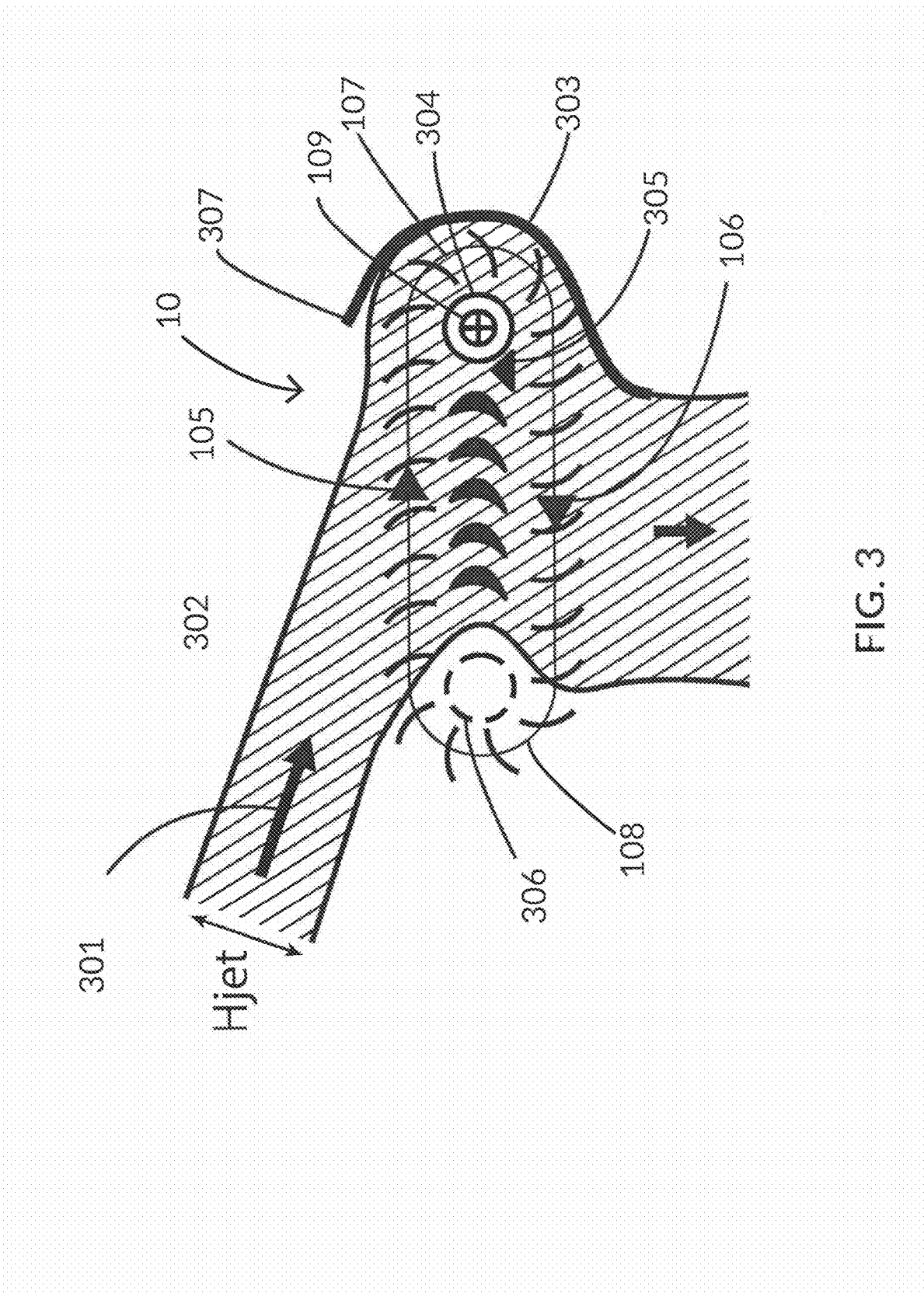
FIG. 3. is a schematic cross-sectional view of a free jet turbine according to various aspects of the invention.

FIG. 3 illustrates a turbine 10 having an arrangement of blades and guidevanes moving in a path as shown in FIG. 1. The working fluid of the turbine 10 shown in FIG. 3 enters the turbine 10 as a free jet of working fluid 301, moving through an atmosphere 302 of substantially lower density than the working fluid 301. For example, in an aspect of the invention, the working fluid 301 can be water, and the atmosphere can be air. The turbine 10 is provided with a system of shrouds and fairings around the first axis of rotation 109. Shroud 303 encircles the first axis of rotation 109 and is spaced apart from the outside of the tips of blades 103 by only a gap small enough to permit free relative motion without collision. For example, the gap in a turbine having blades 103 with chord of 216 mm might be between 10 mm and 20 mm. Large radial gaps between the blades and this shroud could result in increased bypass or leakage flow that reduces the power and efficiency of the turbine 10. The shroud 303 may be extended near the jet 301 to form a cantilevered portion 307 largely out of contact with flow. On the outlet side, the shroud 303 may terminate in a sharp edge near the point of transition from the second segment 107 to the third segment 106. In another aspect, the shroud 303 can have compound curvature, turning to align with the desired streamline of flow leaving the turbine 10. The shroud 303 can also be split into multiple bodies, but any resulting gaps at the joints between bodies should be minimized to reduce leakage or bypass flow.

The turbine 10 is provided with a circular body 304 concentric with the first axis of rotation 109. This body can be, for example, comprised of a shaft, or of a shroud encircling a shaft. A fairing 305 is provided in a position close to the circular body 304. Taken together, the circular body 304 and fairing 305 create a streamlined or tear-drop shape. The circular body 304 and fairing can be combined into a single shroud.

Due to the nature of operation as a free jet turbine, a circular body is not required encircling the second axis of rotation 110, because this area will be filled with ambient atmosphere, not the working fluid. FIG. 3 illustrates the optional presence of a circular body 306 in this area. If desired for mechanical reasons, the presence of a shaft or similar body in this area will not affect the operation of the turbine 10.

Figure 4A:
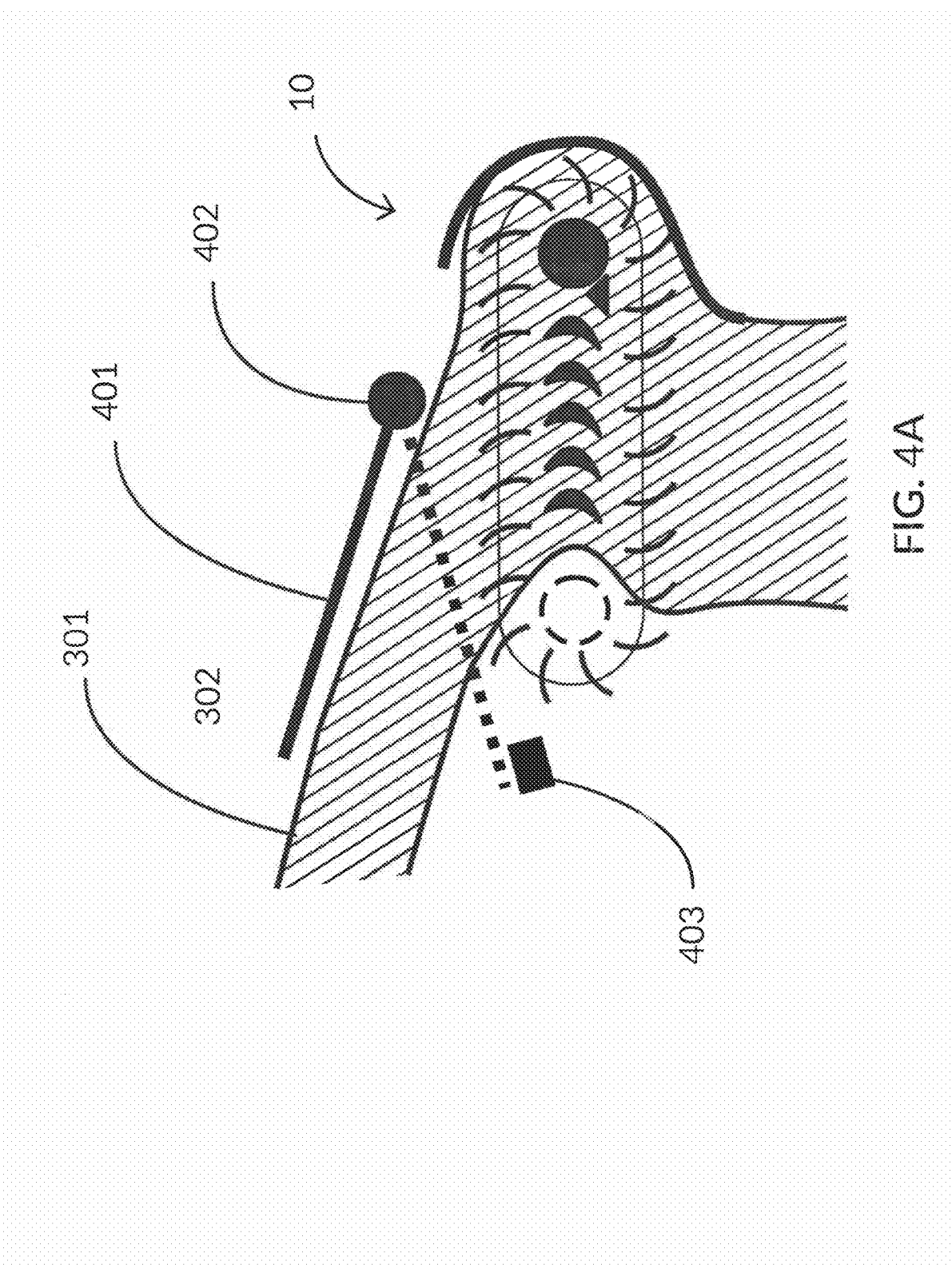
FIG. 4A is a schematic cross-sectional view of a free jet turbine, showing a jet deflector plate in a raised position according to various aspects of the invention.
Figure 4B:
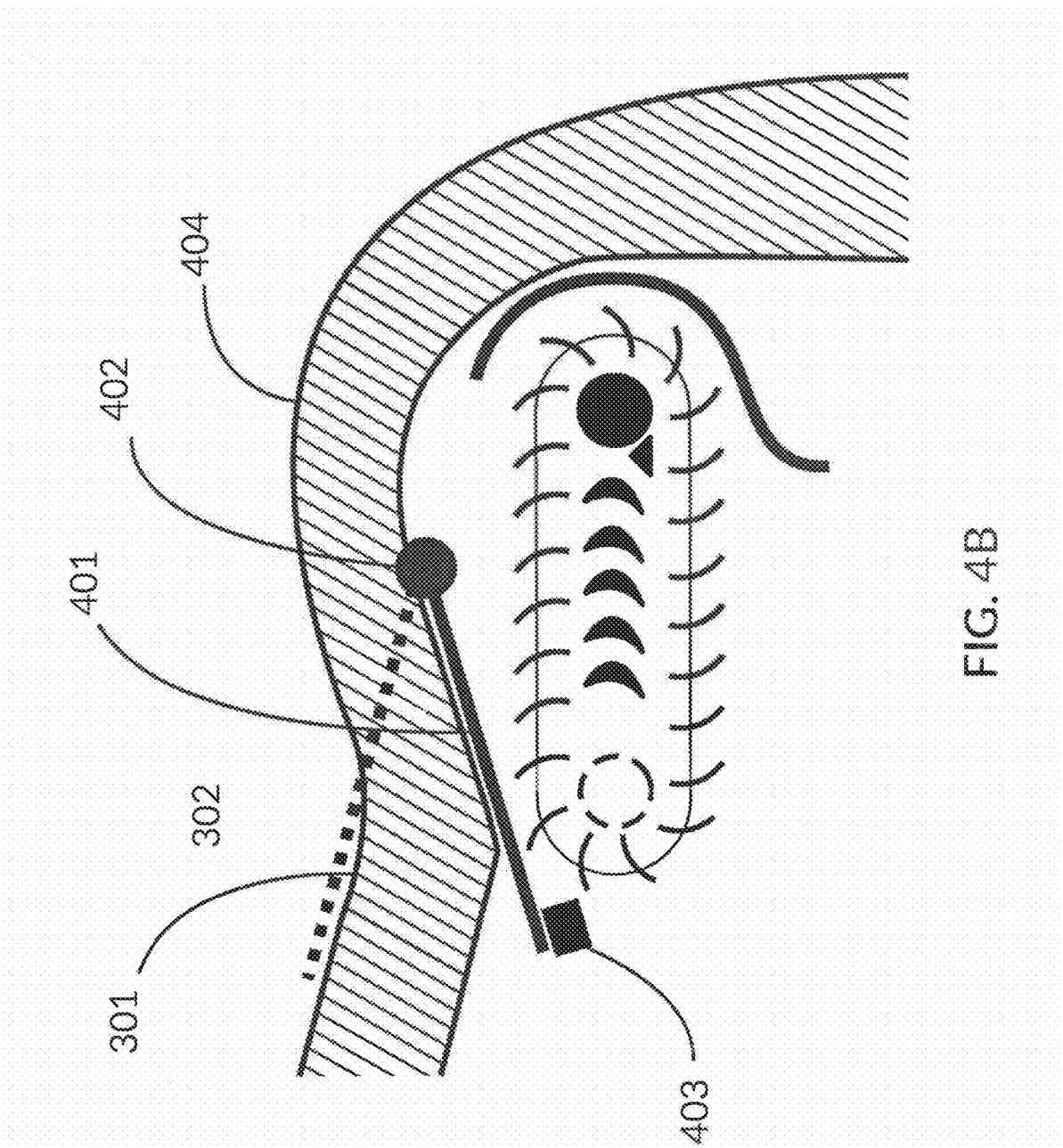
FIG. 4B is a schematic cross-sectional view of a free jet turbine, showing a jet deflector plate in a lowered position according to various aspects of the invention.

FIGS. 4A and 4B illustrate the jet deflector plate 401, according to one aspect of the invention. Jet deflector plate 401 is pivoted around an axis 402. Jet deflector plate 401 can be positioned above turbine 10 so that deflector plate 401 can swing downward. The deflector can be driven downward by its own weight due to gravity, or it can be driven by other means, such as with springs, or with a pneumatic or hydraulic cylinder. In another aspect, the deflector plate can be positioned in other orientations with respect to the jet, such as to the side of the jet, or underneath the jet. During normal turbine operation, the deflector plate 401 is held in the surrounding atmosphere 302 out of contact with the incoming jet of working fluid 301. The means of holding the deflector can be any of a wide range of design options. In one aspect, a pneumatic cylinder connected to a shaft concentric with pivot axis 402 maintains the plate position out of the jet stream. In the event of a power loss, the air pressure is vented and the plate falls into the jet stream. The jet deflector plate can pivot to take a second deflection position, resting on a support 403. In this second position, the jet of working fluid impacts the deflector plate and is directed away from the turbine, taking a new deflected path 404. Deflection of the jet of working fluid will cause forces on the plate 401, which define the size of the plate 401 and of the support 403, which in turn is securely anchored to a structure. In practice this jet deflection function allows fast and safe removal of hydraulic force from the turbine, without requiring any change in the flow rate of the working fluid. This functionality is desirable to allow safe shutdown of the turbine in the event of power loss at the generating station. When used in pipeline systems, particularly pipelines conveying incompressible working fluids such as water, the jet deflector can prevent the risk of pressure surges in the pipeline because it allows fast shutdown of the turbine without requiring any change in flow rate.

Figure 5:
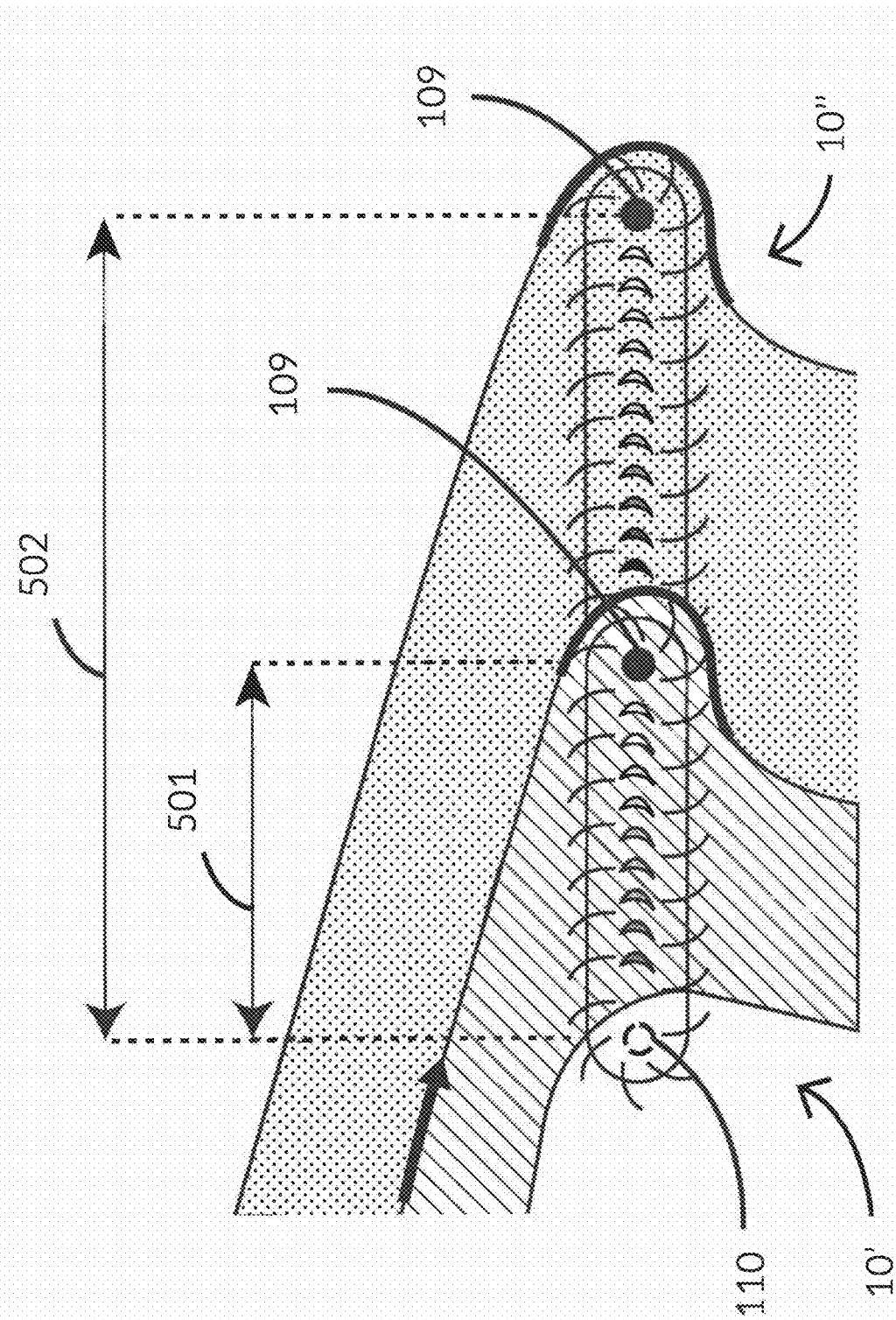
FIG. 5 is a schematic cross-sectional view of a free jet turbine according to various aspects of the invention.

FIG. 5 illustrates how the linear free jet turbine 10 can be built at different lengths. In one turbine 10', the distance between the first axis of rotation 109 and second axis of rotation 110 is relatively short 501, having a ratio of inter-axis distance 501 to blade chord length Lb of about 6-to-1. In a second machine, the distance between the first axis of rotation 109 and second axis of rotation 110 is relatively long 502, having a ratio of inter-axis distance 502 to blade chord length Lb of about 12-to-1.

In a turbine built with blades 103 having a pitch and stagger relationship described in FIGS. 1-2, the perpendicular forces F1*n* and F2*n* provide support to the blades traveling between axes 109 and 110, so that no additional mechanisms are required to prevent mechanical collisions between the moving blades 103 and stationary guidevanes 104. This beneficial attribute of the blade configuration allows for elongated turbines to be constructed in a simple manner without the need for additional structure and/or mechanisms to prevent blade collision. Increased length allows for an increased amount of flow to pass through the turbine, and an increased amount of work to be converted from the working fluid. If a turbine is built having twice the inter-axle distance 502 of a shorter machine having inter-axle distance 501, at a site with the same available pressure, both the flow capacity and power output of the longer turbine would be approximately double that of the shorter turbine. For example, a short turbine having 23 blades with 216 mm chord length Lb, might have an inter-axle distance 501 of 1.4 meters, or a ratio of inter-axle distance to blade chord of approximately 6.5. A longer turbine having approximately twice the power output could have 38 blades, and an inter-axle distance 502 of 2.8 meters, or a ratio of inter-axle distance to blade chord of approximately 13. Shorter and longer machines are also possible in other aspects. In addition, machines using larger or smaller blades are possible, such as machines with blade chord length Lb of approximately 100 mm, or machines having blade chord length Lb of 500 mm or larger, in other aspects.

Figure 6:
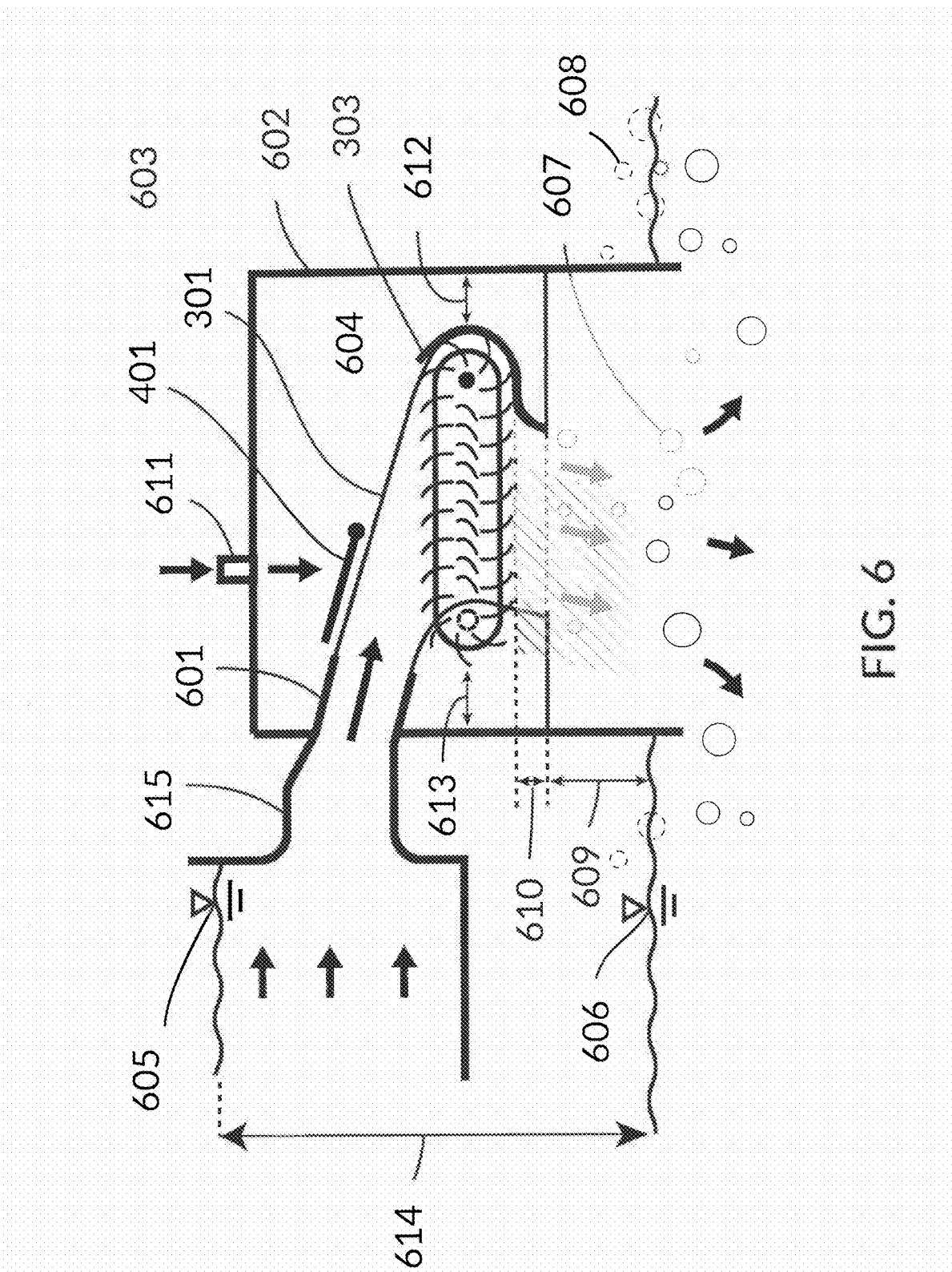
FIG. 6 is a schematic cross-sectional view of a free jet turbine equipped with a confined flow nozzle, and installed in an airtight housing, according to various aspects of the invention.

FIG. 6 illustrates a linear hydraulic turbine in the context of a site having a difference in elevation 614 between a pool of working fluid, such as water, at an upper elevation 605 and a pool at a lower elevation 606. The fluid is conveyed through a pipe or penstock 615 into a nozzle 601, which is sealed in an air-tight manner to an air-tight housing or enclosure 602. This enclosure extends below the surface of the lower pool, such that an enclosed atmosphere 604 is isolated from the ambient external atmosphere 603. The length of the penstock 615 can be arbitrarily large as needed, and its shape can be any convenient shape, such as circular or rectangular in cross-section.

The working fluid, such as water, moves under pressure through a nozzle 601 and exits the nozzle as a free jet 301. The system shown in FIG. 6 derives pressure due to a difference in water levels of two pools, but in other applications, this pressure can come from any available source.

The turbine 10 operates in a manner as described in FIG. 3. A gap 612 is provided between the shroud 303 and the housing wall 602, such that if the deflector plate 401 is lowered, the deflected jet 404 can bypass the turbine blades. This gap 612 should be approximately equal in width to the height of the jet, Hjet.

A gap 613 is provided between the blades 103 moving around the second circular path segment 108 and the housing wall 602, to provide space for water to be flung off the blades without causing drag. This gap 613 should be at least the blade chord length Lb, and preferably greater than three times the blade chord length Lb.

As the free jet of working fluid engages blades 103 of the turbine, air from the enclosed atmosphere 604 is entrained in the working fluid and carried with the outlet flow in the form of bubbles 607. Upon exiting the system into the lower pool, these bubbles rise to the surface and rejoin the external atmosphere 603. Because the housing 602 is airtight, the evacuation of air from the internal atmosphere 604 will create a vacuum pressure, which elevates the internal water level within the housing to a height 609 above the external lower pool elevation 606. An air inlet valve 611 is provided to enable replenishment of fresh air from the external atmosphere 603, into the internal atmosphere 604. This valve can be regulated such that a desired vacuum pressure is maintained inside the enclosed volume. For example, a desirable amount of vacuum pressure would elevate the internal water level to be brought close to but spaced apart by a gap 610 from the second stage of linearly traveling blades. The vacuum pressure adds to the usable pressure on the linear turbine, allowing the turbine to use most of the available elevation difference 614, while also allowing the turbine to be placed at a convenient elevation above the lower pool, such as to avoid damage during high flow events, such as floods. This capability is important at hydropower projects that have small elevation drops, since the proportion of the total available drop represented by the unit elevation above tailwater can be significant. For example, at a project with 20 feet of total drop from upper pool to lower pool, the unit may need to be positioned 6 feet above the lower pool, so as to avoid being damaged when the tailwater rises during floods. The ability to use vacuum suction allows the turbine to take advantage of the 6 feet of drop that would otherwise be lost.

Figure 7A:
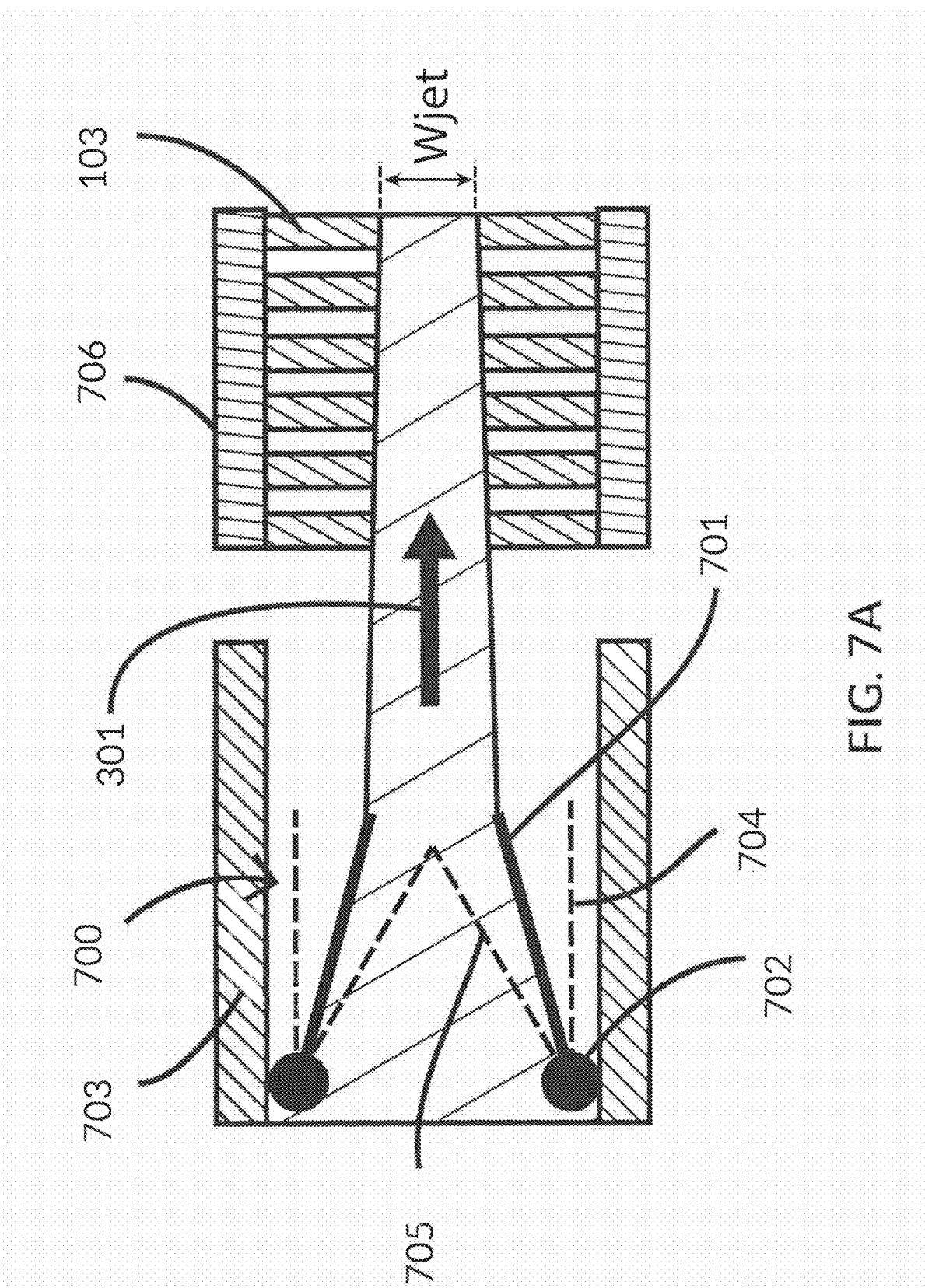
FIG. 7A is a plan view of a nozzle according to various aspects of the invention.
Figure 7B:
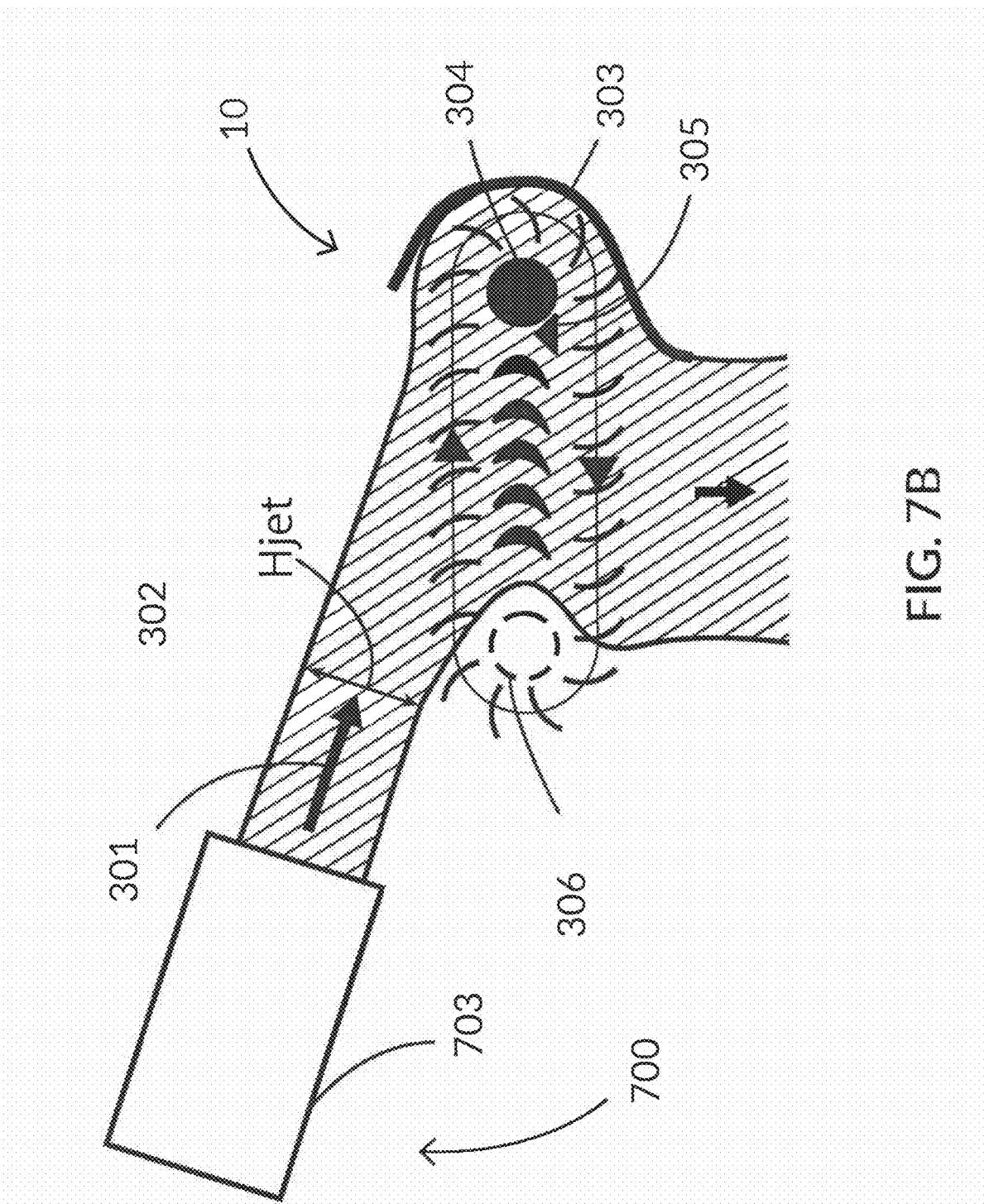
FIG. 7B is a schematic cross-sectional view of a free jet turbine system according to various aspects of the invention.
Figure 8:
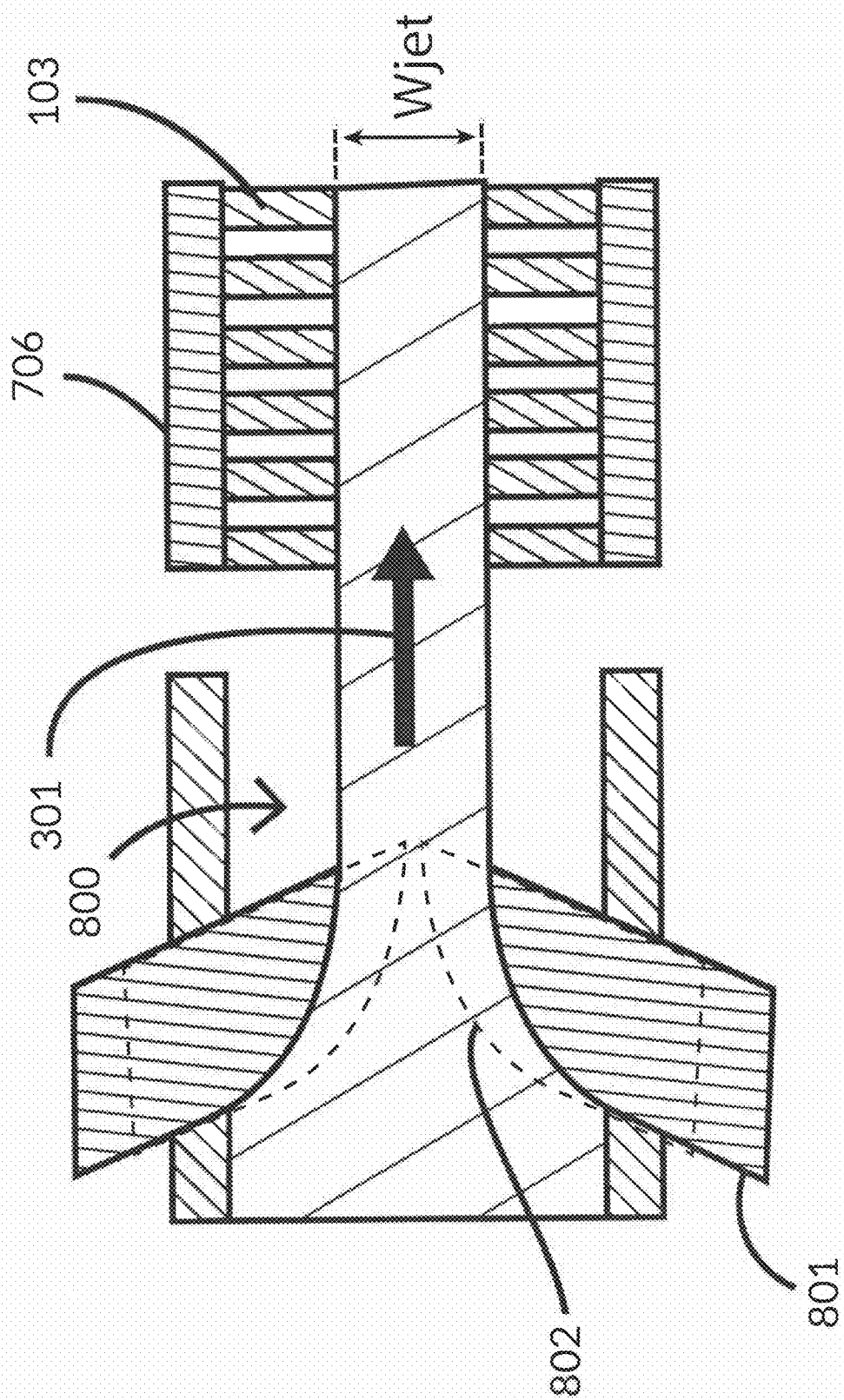
FIG. 8 is a plan view of a nozzle according to various aspects of the invention.

FIGS. 7 and 8 illustrate two possible configurations for a nozzle allowing development of a free jet of working fluid with adjustable width Wjet. Adjustment of working fluid free jet width allows for modulation of flow rate through the turbine 10, without changing the speed of the working fluid free jet. This allows for adjustment of the turbine flow rate in response to the available flow rate, while maintaining efficient operation. In one aspect, the free jet width is adjustable from its maximum value, to zero.

FIG. 7 shows a nozzle 700 with a pair of panels 701 mounted inside a housing 703. The panels are hinged at an axis 702. In one aspect, axis 702 can be perpendicular to first axis 109 and second axis 110. A jet of working fluid 301 exits the nozzle, and enters the turbine blades 103. In the maximum opening position 704, the panels are parallel to the flow. In the completely closed position 705, the panels meet at their tips and no flow is allowed through. The nozzles can be positioned at any angle in between these limits. The mechanical system to position this nozzle can be any of a wide variety of designs. For example the panels can be driven by a pneumatic, hydraulic, or electric actuator. The panels can be driven independently, or they can be coupled by mechanical linkages. This kind of nozzle can also be constructed with only a single panel, which spans the entire throat width to modulate flow.

FIG. 8 illustrates a nozzle 800 having a pair of panels 801 mounted inside a housing 803. A jet of working fluid 301 exits the nozzle, and enters the turbine blades 103. The panels translate in and out allowing modulation of flow. At the completely closed position 802, no flow is permitted to pass.

A benefit of nozzle 700 vs nozzle 800, is that in some aspects nozzle 700 can be made more physically compact. A benefit of nozzle 800, is that the shape of the panels can be designed such that flow smoothly accelerates into the working fluid jet.

FIGS. 9A, 9B, 10A, and 10B illustrate possible configurations for a nozzle allowing development of a free jet of working fluid with adjustable height Hjet. Adjustment of working fluid jet height allows for modulation of flow through the turbine without changing the speed of working fluid free jet. However, unlike nozzles which adjust the working fluid free jet width Wjet, nozzles which adjust the working fluid free jet height Hjet result in jets that intersect the turbine 10 with varying cross-section.

Figure 9A:
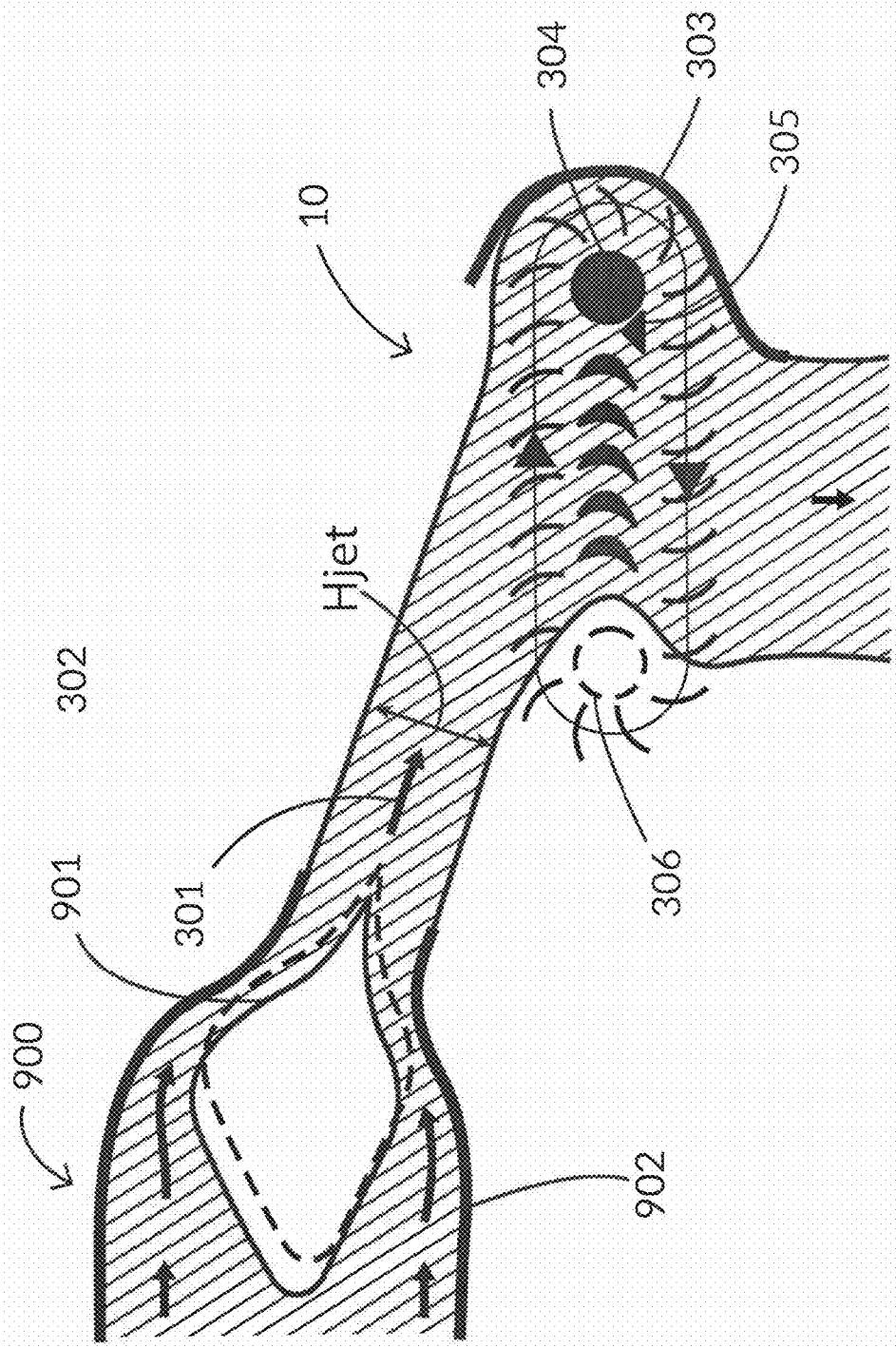
FIG. 9A is a schematic cross-sectional view of a free-jet turbine system according to various aspects of the invention.

FIG. 9A illustrates a nozzle 900 which consists of a body 901 adjustably positioned within the flow flowing through a nozzle housing 902.

Figure 9B:
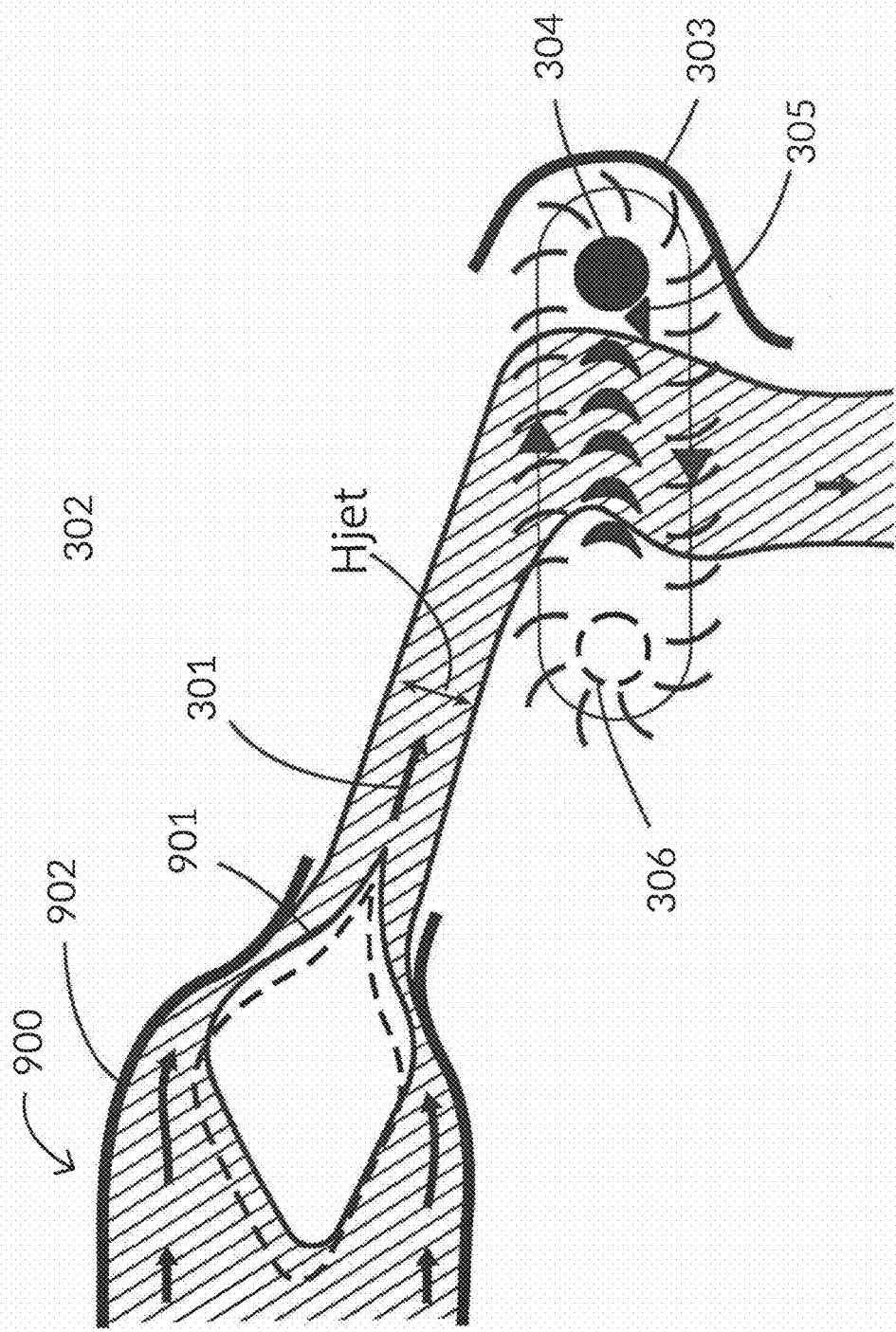
FIG. 9B is a schematic cross-sectional view of a free-jet turbine system according to various aspects of the invention.

FIG. 9B illustrates an alternate position of body 901, in which the nozzle exit orifice is constricted, and the height of the free jet of working fluid is reduced.

Figure 10A:
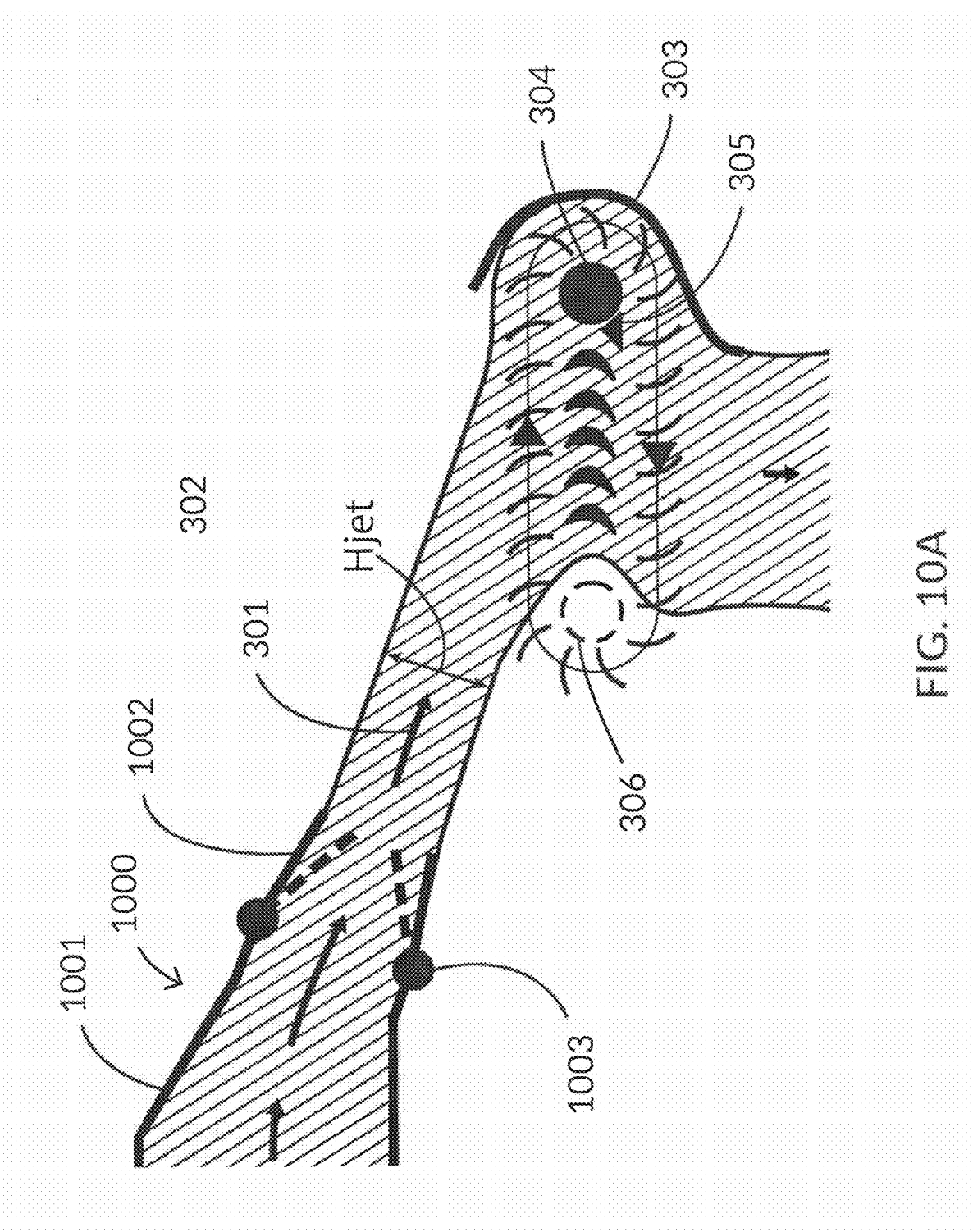
FIG. 10A is a schematic cross-sectional view of a free-jet turbine system according to various aspects of the invention.
Figure 10B:
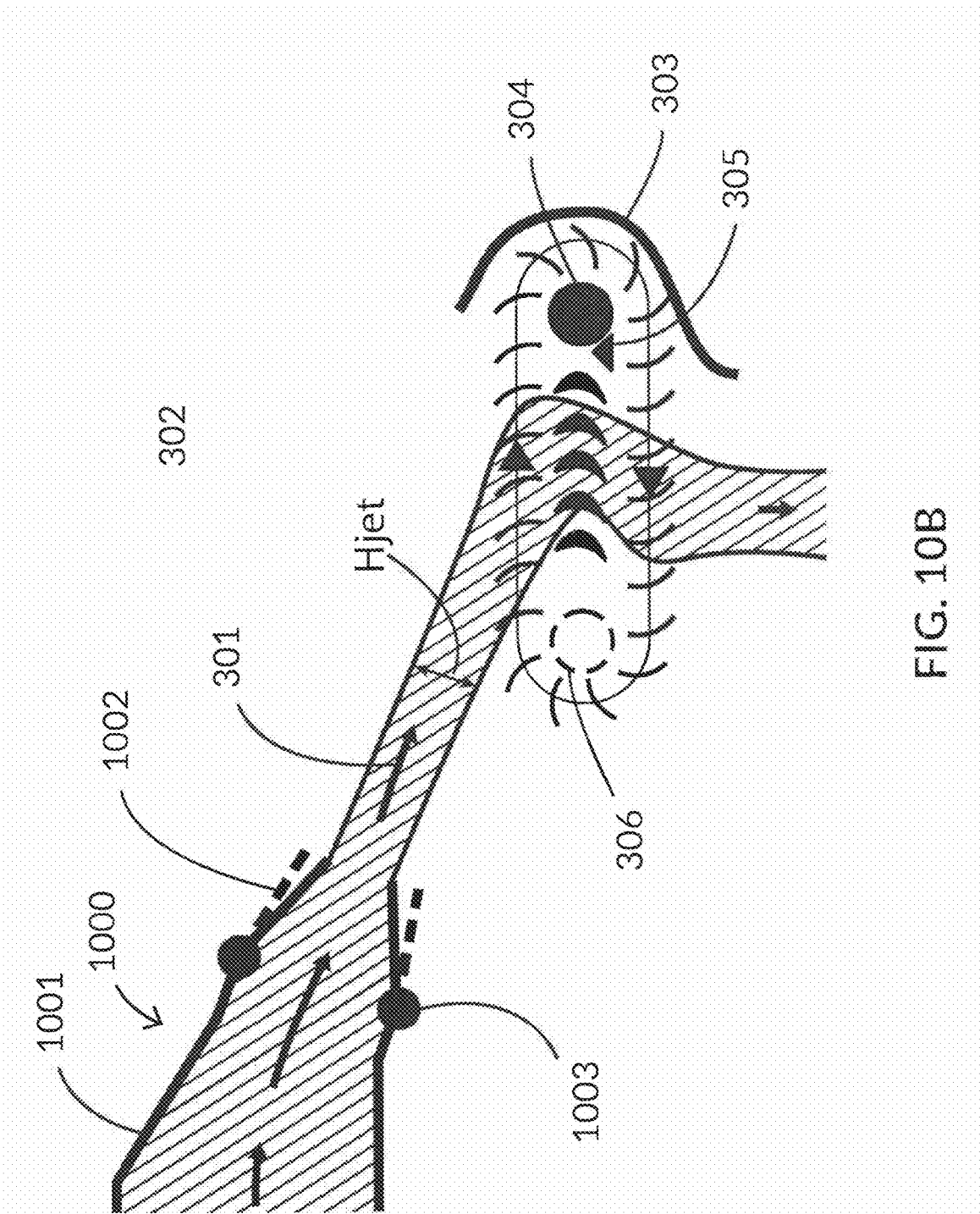
FIG. 10B is a schematic cross-sectional view of a free jet turbine system according to various aspects of the invention

FIG. 10A illustrates a nozzle 1000 similar to the nozzle shown in FIG. 7, except that the orientation of the panels 1002 and pivot axis 1003 is such that the pivot axis 1003 is parallel to turbine axis 109.

Figure 11:
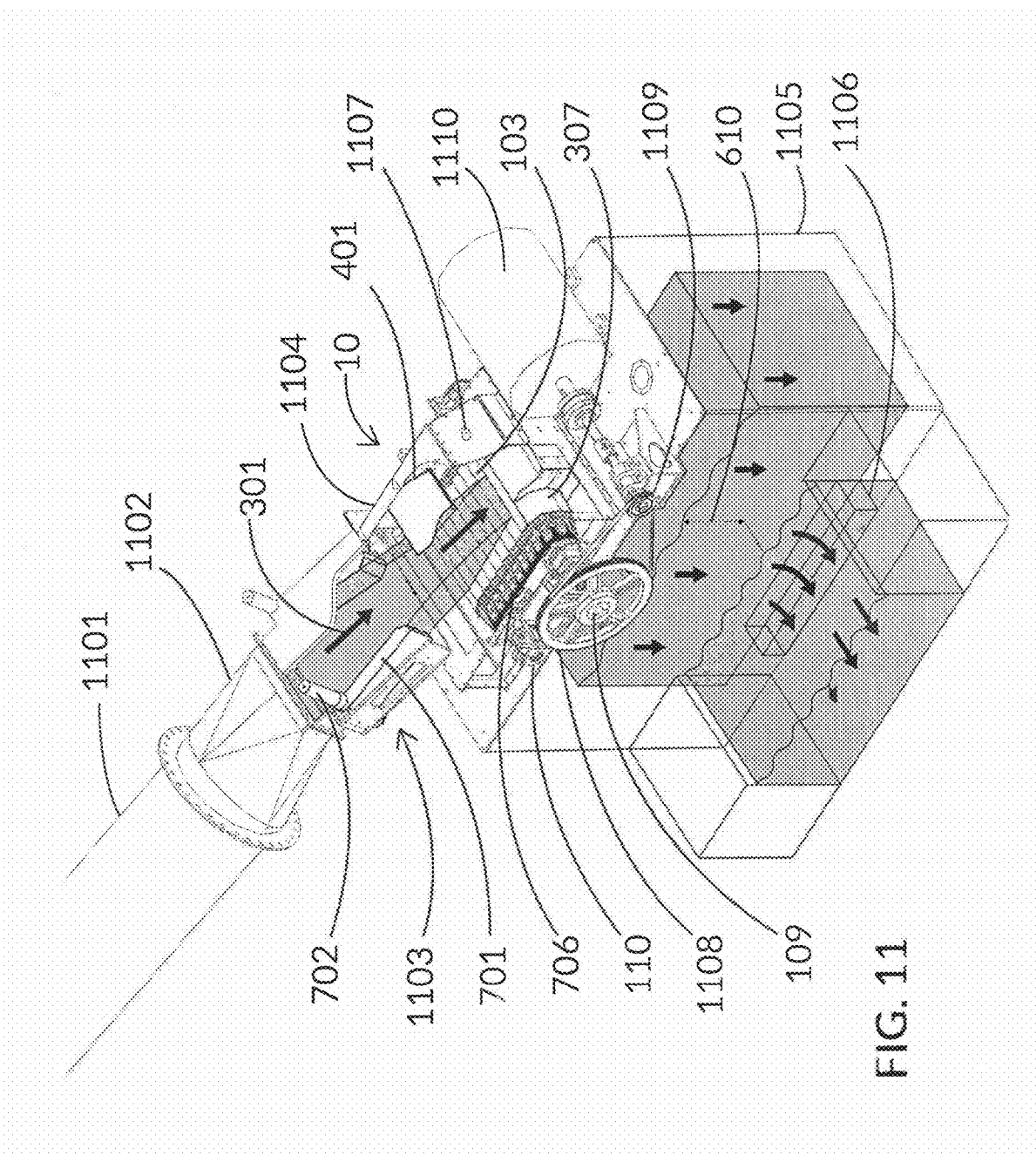
FIG. 11 is a perspective view of a free-jet turbine system according to various aspects of the invention.

FIG. 11 illustrates a hydropower system consisting of a penstock of circular cross-section 1101 connected to a transition conduit 1102 which changes in cross-section from circular to rectangular. This transition conduit is connected to a nozzle 1103. The nozzle is equipped with two panels 701, hinged about shafts 702. Working fluid flows through the penstock toward the nozzle, and exits the nozzle as a free jet 301. The nozzle 1103 is connected to an air-tight housing 1104 enclosing the turbine 10. The housing 1304 is mounted on a concrete plinth 1105. The plinth 1105 has an outlet 1106, through which the working fluid exits the plinth. A jet deflector plate 401 is positioned just above the working fluid free jet 301. A vacuum relief valve 1107 is provided to regulate the suction pressure inside the housing 1104, developed by elevation 610 of the internal water level over the tailwater level. The working fluid free jet 301 engages blades 103, which are attached at each end to drive belts 706. The blades and belts rotate around a first axis 109 and a second axis 110. A large pulley 1108 mounted rigidly to axis 109 is connected by a belt to a small pulley 1109 mounted on a third axis. This pulley drives a generator 1110, which converts torque and speed into electricity.

Figure 12B:
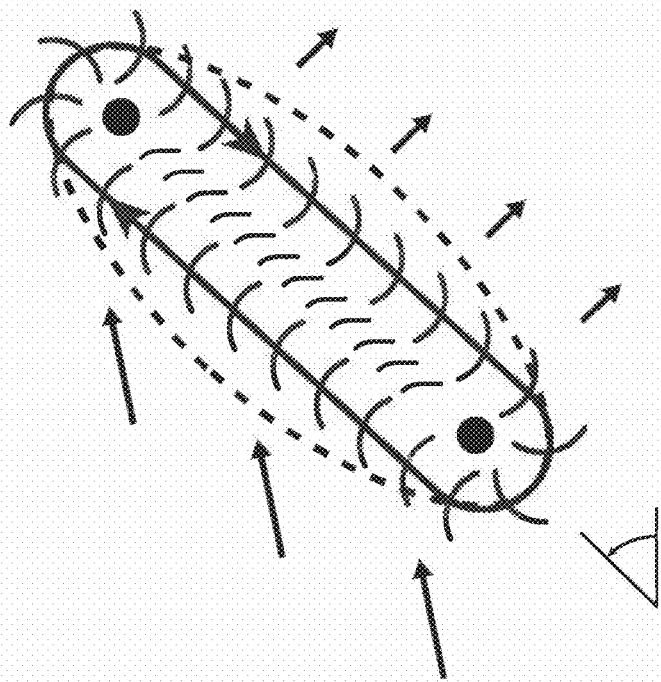
FIG. 12B is a schematic cross-sectional view of a turbine according to various aspects of the invention.
Figure 12A:
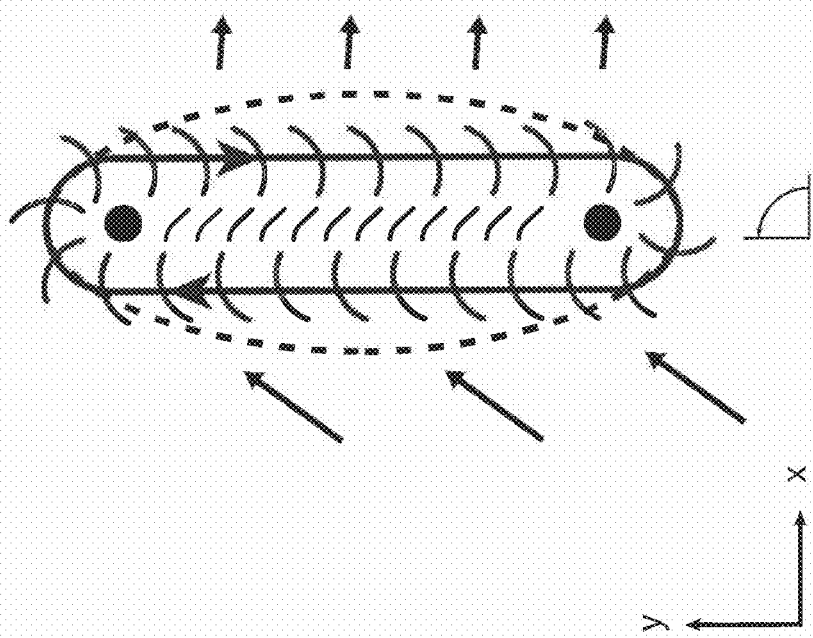
FIG. 12A is a schematic cross-sectional view of a turbine according to various aspects of the invention.

FIG. 12A illustrates turbine 10 in one orientation, in which axis 109 and axis 110 are arranged on a vertical plane.

FIG. 12B illustrates turbine 10 in an orientation in which axis 109 and axis 110 are arranged on a plane at an angle relative to horizontal.

Operation

A linear turbine with blades of fixed pitch angle but reversing stagger angle can operate as follows, according to an aspect of the invention. An array of blades 103 travels along a path having a first segment 105, a second segment 107, a third segment 106, and a fourth segment 108. After first segment 105, blades 103 travel around a first axis of rotation 109 in second segment 107, before moving along a third segment 106, returning around a second axis of rotation 110 in fourth segment 108, before re-entering first segment 105. An array of stationary guidevanes 104 is arranged within the space enclosed by the path of blades 103.

The blades 103 maintain a substantially fixed pitch angle with respect to the tangential direction of their path of travel, such that the pitch angle $\theta 1$ in the first segment 105 is substantially equal to the pitch angle $\theta 2$ in the third segment 106. The blades 103 have a curved shape, and their chord line is oriented so that the pitch angle $\theta 1$ is less than 90 degrees. The curvature of the blades 103 is not symmetrical with respect to the line of the path of travel in first stage B1 and second stage B2. Regardless of the position of the blade 103 on its path, a vector perpendicular to the chord line of the blade, and projected off the convex surface of the blade, will have a nonzero component oriented perpendicular to the path of travel, and pointing outwards away from the area enclosed by the path of blade travel. All blades 103 move with the same linear velocity, such that U1 is equal in magnitude to U2 (FIG. 2).

Work is converted to useful force within the turbine 10 in two stages, corresponding to the first segment 105 and third segment 106. As shown in FIG. 2, the movement of working fluid through the turbine 10 can be visualized by the streamline 204. In the first stage 105, a working fluid, such as water, moves toward the turbine with velocity V1, oriented at an acute angle $\alpha 1$ with respect to the path of blade travel. In one aspect of the invention, $\alpha 1$ can range from approximately 10 degrees to approximately 45 degrees. In another aspect of the invention, $\alpha 1$ can range from approximately 15 degrees to approximately 30 degrees. The blades 103 simultaneously turn, and decelerate the flow, such that the working fluid exits the first segment 105 with a new orientation and reduced velocity V2. Turning of the flow occurs due to the curvature of the blades 103. Deceleration of the flow occurs because the combination of blade shape and negative stagger angle results in an expansion of the turbine throat from its inlet O1$i$ to its outlet O1$o$.

After exiting the first segment 105, the working fluid flow is turned by stationary guidevanes 104, which substantially re-orient the streamline to provide efficient interaction with the blades 103 now moving in the third segment 106. The working fluid flow exits the stationary guidevanes 104 with a velocity V3 oriented at an acute angle $\alpha 3$ with respect to the path of blade travel, and is then steeply turned by the blades 103 in the third segment 106. In one aspect of the invention, the magnitude of $\alpha 3$ can be approximately equal to $\alpha 1$. In another aspect, the magnitude of $\alpha 3$ can be similar to, but not approximately equal to $\alpha 1$. Despite having had no change in the pitch angle $\theta 2$ versus the pitch angle $\theta 1$, the blades 103 in third segment 106 have a converging throat, such that O2$o$ is smaller than O2$i$. The working fluid flow leaves the blades 103 in third segment 106 having a significantly reduced velocity V4 and exiting at an angle approximately perpendicular to the third segment 106. In one aspect of the invention, a turbine can experience a reduction in velocity from V1 to V4 of approximately 40% to approximately 75%. Turbines having smaller values of $\alpha 1$ and $\alpha 3$ will generally have larger magnitude of velocity reduction, but because of the steeper inlet angle, these designs may have lower maximum flow rate. Turbine designs can find an appropriate balance between maximum flow rate and efficiency based on application-specific parameters, such as available pressure or flow.

The blades 103 can be supported by a wide range of mechanical systems. For example, the blades 103 may be attached to belts or chains, or the blades may operate in tracks or guides. The blades 103 may be supported by one or both of their ends, or each blade may be cantilevered symmetrically or asymmetrically.

The turbine 10 can be operated in a wide range of environments. For example, it can be operated in an open-channel-flow setting such as a canal or a river, or a tidal setting. Or, the turbine can be operated in a confined-flow setting, enclosed in a pressurized, water-filled housing, such as is disclosed in U.S. Pat. No. 7,645,115. Further, this type of turbine can be operated as a free-jet turbine.

The orientation and shape of the blades 103 with a negative stagger angle $\lambda 1$ in first segment 105 and a positive stagger angle $\lambda 2$ in third segment 106 result in beneficial orientation of forces under operation which allow for a simplified construction of this kind of turbine 10. Typical linear turbines can require additional mechanisms such as idlers or tracks and guides to prevent collisions between the moving blades and stationary guidevanes. However, the orientation of blades 103 according to an aspect of the present invention result in perpendicular forces $F1n$ and $F2n$ that enable each blade 103 to support its own mass and prevent risk of mechanical collisions between the moving blades 103 and stationary guidevanes 104. With this blade design, linear machines can be built having a long shape with an increased distance between first axis 109 and second axis 110. For example, FIG. 5 illustrates a turbine 10" having twice the axle spacing 502 between first axis 109 and second axis 110, of a similar unit 10' having an axle spacing 501 between first axis 109 and second axis 110. This ease of unit sizing allows for much more powerful and cost-effective turbines to be built, in a modular manner. For example, the machine with short axle spacing 501 can use the same blades, guidevanes, and related mechanical systems as the machine with long axle spacing 502. If the blades hydraulic reaction forces did not keep themselves from colliding with the stationary guidevanes 104, the long machines would require high belt or chain tension, and/or additional mechanical systems such as idlers or tracks, to support the blades. Any of these additional measures imposes increased complexity, friction, and reduced life compared to the turbine of this invention.

According to an aspect of the invention, a jet 301 of working fluid, such as water, can be propelled through an atmosphere 302 of substantially lighter density, such as air (FIG. 6). The jet 301 can be formed by any suitable structure, such as an enclosed nozzle 601, or an open-channel sluice. In the case of an enclosed nozzle 601, the velocity of the jet 301 is derived as the manifestation of a pressure differential from the inlet of the nozzle to its outlet. In the case of an open channel sluice, the velocity of the jet 301 is derived as the manifestation of a drop in elevation from inlet to outlet of the sluice. Ideally, the jet 301 is rectangular in cross-section, having a height Hjet and a width Wjet. But jets of any cross-section, including circular jets, can be used with turbine 10. Turbine 10 utilizes blades 103 which move along a path having a first segment 105 between a second axis and a first axis, a second segment 107 around a first axis 109, a third segment 106 between a first axis 109 and a second axis 110, and a fourth segment 108 around a second axis 110, prior to re-entering the first path 105. In the space enclosed by the path of moving blades 103, is arranged an array of stationary guidevanes 305. A shroud 303 is provided which substantially encircles the tips of the blades moving around the axis 109.

As the jet enters the array of moving blades 103 in the first path 105, its speed and direction are changed, and work is done on the blades 103, resulting in reaction forces on the blades 103. After passing through the first array 105 of moving blades 103, the working fluid is redirected by stationary guidevanes 105, and moves through the second array 106 of moving blades prior to exiting the turbine. Forces are transmitted to the moving blades 103 in the path 106 due to the change in speed and direction. These forces can be externalized in a wide variety of methods including aggregation into drive belts or chains and extraction via a rotating shaft. The shroud 303 functions to constrain the working fluid to move in a controlled manner around the first axis of rotation 109, such that flow around this axis is substantially coherent and uninterrupted. Without this shroud, the working fluid may depart the turbine in an undesirable manner, causing significant losses of efficiency. Similarly, the shrouds 304 and 305 provided around the axis of rotation 109 provide a related function, and work in conjunction with the shroud 303 to enforce coherent and efficient flow around this part of the turbine. The shrouds 304 and 305 may be combined into the same body, or split apart, as long as the gaps between the bodies remain small to prevent leakage or bypass flows from becoming large. The shroud 304 can also take the shape of a shaft, if desired. Similarly, the gap between the moving blades 103 and the shroud 303 should be small, but large enough to prevent any mechanical collisions between blades 103 and shroud 303. The shroud 303 may be segmented for ease of assembly or maintenance, but any gaps between mating parts should be minimized to reduce bypass flow or losses. The shroud 303 can have an extension 307 near the jet inlet, which functions to smoothly collect and guide the incoming jet stream through this area of the turbine. The shroud 303 can have a compound curvature at its outlet, in which the shroud is smoothly formed so that its shape at outlet is tangent to the streamlines leaving the turbine, approximately perpendicular to path 106.

The inlet of the jet is oriented to enter the first segment 105 of moving blades 103 near the point of intersection between the first segment 105 and the fourth segment 108. This position is chosen to maximize the working cross-section of the turbine 10, while avoiding undesirable drag loads or impact between the jet and the convex face of blades approaching the jet from path 108.

The area underneath the jet, near the axis 110, will be largely filled with the ambient atmosphere 302, although significant splashing of the working fluid will be present. Although a shaft or shroud indicated by the dashed lines 306 may be desired in this location for mechanical reasons, it is unnecessary from a fluid dynamic standpoint.

A free jet linear turbine can utilize a jet deflector to provide fast and safe shutdown capabilities. The jet 301 entering the turbine 10 crosses through a large distance enclosed only by ambient atmosphere 302. A deflector plate 401 can be provided, hinged about an axis 402, which in the event of an emergency, can be deployed to take a deflection position in which the jet is substantially diverted 404 around the moving blades 103. Importantly, this diversion can happen extremely quickly, for example, in less than 1 second, without causing a change in flow rate through the water conveyance. Because there will be no change in flow rate, there will be no sudden pressure surges, for example, in upstream or downstream piping associated with a turbine using a jet deflector plate 401.

The deflector plate 401 and associated mechanical components such as support 403 and shaft about axis 402 can be designed to withstand forces due to the impulse created as a result of diverting the working fluid. For example, if a jet having Hjet=0.5 meters and Wjet=1.2 meters, entering the turbine 10 at an inlet angle α1=21 degrees, driven by a working pressure equivalent to 6 meters of water head, is then deflected through an angle of 30 degrees relative to the first segment of blade travel 105, the plate will experience a total impulse force of approximately 64 kN, or 14,000 pounds of force. The dimensions of the plate 401, support 403, and shaft about axis 402 all will need to be selected to ensure operation without mechanical failure. For example, assuming the plate is constructed of mild steel having yield strength of approximately 250 MPa (36 ksi), the required plate thickness to ensure a yield strength safety factor of approximately 2, would be approximately 25 mm (1 inch).

A free jet linear turbine can be manufactured in a manner in which all available pressure head is utilized, and the drop between the turbine's outlet and the lower pool is recovered to the greatest extent possible. In such a configuration, the free jet linear turbine is enclosed inside a pressure-tight housing 602. This housing is sealed in a manner allowing only a controlled exchange of atmosphere between the outside atmosphere 603 and the enclosed atmosphere 604. An enclosed nozzle 601, sealed to the housing 602, directs a jet of working fluid 301, into the turbine, which operates in the manner described above. The velocity of the jet can be derived, for example, by a pressure driven by an elevation difference between two bodies of the working fluid. The action of the jet moving through the turbine, and striking the pool of fluid in the outlet, will entrain bubbles 607 of the enclosed atmosphere 604, and momentum of the moving fluid carries these bubbles out of the enclosed housing, where they rise to the surface and join the exterior atmosphere 603. Unless fresh air is allowed to leak into the enclosed atmosphere 604, this process will evacuate the enclosed chamber, and a suction pressure will develop. This suction pressure will add to the working pressure on the nozzle, increasing the jet speed and turbine power. It is desirable to maximize this suction pressure, but it is not desirable for this type of turbine to operate in contact with the lower pool. Therefore it is desirable to provide a regulating valve 611, which can be adjusted to allow a flow of fresh air from the outside atmosphere 603 into the enclosed atmosphere 604, which is balanced so as to maintain a water level 609 inside the enclosed chamber which is near but below 610 the moving blades.

An aspect of the free jet linear turbine of this invention, is that its power output and flow rate can be adjusted by changing the cross-sectional area of the jet, without necessarily changing the jet speed or the jet orientation angle. This is a unique ability for high-flow turbines, which must usually force a change in fluid angle at the same time as a change in flow is accomplished. The benefit of this ability in a linear free jet turbine is that the efficiency of such a turbine can be nearly constant across a wide range of flow rates.

The cross-sectional area of the free jet of working fluid can be changed in numerous ways. For example, a rectangular jet can be adjusted in either width, or height, or both. FIGS. 7-8 illustrate two alternative means of adjusting the jet's width Wjet, with a nozzle having adjustable panels. In FIG. 7, a panel 701 is hinged about an axis 702, and by rotating the panel, the jet's width is adjusted. Such a panel arrangement can be accomplished with a single panel, or multiple panels. In FIG. 8, a panel 801 is translated, and by changing its position, the jet's width is adjusted. This type of nozzle can be built with a single panel, or multiple panels. The panel may have features, such as curvature, to provide shape to the jet in a manner which minimizes energy losses.

FIGS. 9-10 illustrate two alternate means of adjusting a jet's height Hjet. FIG. 9A illustrates a body 901, positioned within a housing 902. Flow moves around this body before exiting the nozzle body as a free jet. The body 901 can be translated to reduce the outlet orifice size as shown in FIG. 9B. The jet is reduced in height and works on a reduced portion of the turbine's length. FIG. 10A illustrates a nozzle having a panel 1002 hinged at an axis 1003. When adjusted, the panel will change the height of the jet. This type of nozzle can be built with a single panel, or multiple panels. A similar effect can be accomplished with a panel that translates, rather than hinges.

A benefit of a nozzle design that allows modulation of flow by changing jet width rather than jet height is that the resulting flow pattern will interact with the entire turbine cross-section in an efficient manner, rather than a subset of the cross-section.

FIG. 11 illustrates a free jet linear hydroelectric turbine constructed using the inventions of this patent. Water under pressure flows through a penstock 1101, through a section of pipe which adapts the round penstock to a rectangular cross-section 1102, and into a nozzle 1103 having the ability to adjust flow rate by changing the jet width. This nozzle has two panels 701, hinged about shafts 702. The nozzle is attached to an air-tight housing 1104, which surrounds the linear free jet turbine. This housing 1104 is mounted to a hollow concrete foundation, or plinth 1105. The concrete plinth 1105 has an exit opening 1106 which is positioned at an elevation below the lower pool. As the unit operates, air is evacuated from the interior of the housing and plinth, and the internal water level is elevated, providing suction head 610 to augment the pressure driving the jet 301. The water level inside the plinth is regulated with an automatic vacuum regulating valve 1107. The turbine's blades are attached at their ends to a pair of belts 706, which operate around sprockets mounted to a pair of parallel shafts. One of these two shafts supports a large pulley 1108, which drives a third shaft via a belt operating on a smaller pulley 1109. This speed-increasing power take-off system is connected with couplings to a generator 1110, which converts mechanical torque and speed into electricity. The turbine is equipped with a jet deflector plate 401, which is normally positioned in the air just above the incoming jet. In an emergency, this plate is released into the jet stream, which it nearly instantly diverts around the runner, through a gap between the shroud and the housing, harmlessly depowering the turbine without changing the flow rate in the penstock.

FIGS. 12A and 12B illustrate how the turbine 10 can be oriented at any angle relative to horizontal. For example as shown in 12A, turbine 10 can be oriented vertically with respect to horizontal, such that first axis 109 and second axis 110 are spaced along a vertical plane. In another aspect, as shown in FIG. 12B, first axis 109 and second axis 110 are spaced along a plane that is angled with respect to horizontal.

What is claimed is:
1. A turbine, comprising:
a plurality of blades configured to travel a path around a first axis and a second axis parallel to the first axis, the path comprising:
a first segment from the second axis to the first axis, the first segment being a first stage of the turbine,
a second segment around the first axis, a third segment from the first axis to the second axis, the third segment being a second stage of the turbine, and a fourth segment around the second axis;

wherein each of the plurality of blades have an orientation relative to a vector of blade travel resulting in a blade negative stagger angle in the first stage of the turbine, and a blade positive stagger angle in the second stage of the turbine.

2. The turbine of claim 1, wherein the first segment is substantially linear, the second segment is substantially arc-shaped, the third segment is substantially linear, and the fourth segment is substantially arc-shaped.

3. The turbine of claim 1, wherein the first axis and the second axis are spaced along a vertical plane.

4. The turbine of claim 1, wherein each of the plurality of blades is connected at a first end to a moving structure and at a second end to a second moving structure to travel the path.

5. The turbine of claim 4, wherein the moving structure and the second moving structure are belts.

6. The turbine of claim 1, wherein each of the plurality of blades is connected to a moving structure at its mid-span, such that ends of each blade are cantilevered.

7. A turbine, comprising:
a plurality of blades configured to travel a path around a first axis and a second axis parallel to the first axis, the path comprising:
a first segment from the second axis to the first axis, the first segment being a first stage of the turbine,
a second segment around the first axis,
a third segment from the first axis to the second axis, the third segment being a second stage of the turbine, and
a fourth segment around the second axis;
wherein each of the plurality of blades have an orientation relative to a vector of blade travel resulting in a blade negative stagger angle in the first stage of the turbine, and a blade positive stagger angle in the second stage of the turbine, and
wherein the first axis and the second axis are spaced along a horizontal plane.

8. A turbine, comprising:
a plurality of blades attached to a structure and traveling a path comprising a first stage substantially linear portion, a first substantially arc-shaped portion, a second stage substantially linear portion, and a second substantially arc-shaped portion;
a plurality of stationary guide vanes arranged in a space enclosed by the structure; and
a shroud positioned adjacent to the first substantially arc-shaped portion and conforming to a curvature of the first substantially arc-shaped portion,
the turbine being configured to receive a free jet working fluid, the free jet working fluid having a flow pattern through the turbine in a plane substantially perpendicular to the first stage and the second stage,
wherein each of the plurality of blades have an orientation relative to a vector of blade travel resulting in a blade negative stagger angle in the first stage substantially linear portion, and a blade positive stagger angle in the second stage substantially linear portion.

9. The turbine of claim 8, wherein the free jet working fluid enters the turbine at an angle less than or equal to 45 degrees with respect to a line of blade travel in the first stage.

10. The turbine of claim 8, wherein a maximum absolute velocity of the free jet working fluid occurs prior to entering the first stage.

11. The turbine of claim 8, wherein the plurality of blades at the first stage and the second stage are configured to engage the free jet working fluid in an impact-free manner.

12. The turbine of claim 8, wherein the flow path of the free jet working fluid leaving the second stage exits in a direction substantially perpendicular to a line of travel of the second stage of blades.

13. The turbine of claim 8,
wherein the shroud has a first end positioned at a location approximately equal to a beginning of the first substantially arc-shaped portion, and
wherein the shroud has a second end positioned at a location approximately coincident with a trailing edge of a first interior guide vane.

14. The turbine of claim 8, wherein the turbine has a clearance between tips of the plurality of blades moving around the second arc-shaped path and a closest stationary wall,
wherein the clearance is at least approximately 1 blade chord length.

15. The turbine of claim 8, wherein the turbine is configured to receive a free jet working fluid from an open channel sluice.

16. A turbine, comprising:
a plurality of blades attached to a structure and traveling a path comprising a first stage substantially linear portion, a first substantially arc-shaped portion, a second stage substantially linear portion, and a second substantially arc-shaped portion;
a plurality of stationary guide vanes arranged in a space enclosed by the structure;
a shroud positioned adjacent to the first substantially arc-shaped portion and conforming to a curvature of the first substantially arc-shaped portion; and
a movable structure configured to have a deflection position and a non-deflection position,
the turbine being configured to receive a free jet working fluid, the free jet working fluid having a flow pattern through the turbine in a plane substantially perpendicular to the first stage and the second stage,
wherein when the movable structure is in the deflection position, the movable structure redirects the free jet working fluid away from the plurality of blades.

17. A turbine, comprising:
a plurality of blades attached to a structure and traveling a path comprising a first stage substantially linear portion, a first substantially arc-shaped portion, a second stage substantially linear portion, and a second substantially arc-shaped portion;
a plurality of stationary guide vanes arranged in a space enclosed by the structure; and
a shroud positioned adjacent to the first substantially arc-shaped portion and conforming to a curvature of the first substantially arc-shaped portion,
the turbine being configured to receive a free jet working fluid, the free jet working fluid having a flow pattern through the turbine in a plane substantially perpendicular to the first stage and the second stage,
wherein the turbine is enclosed by a chamber, the chamber being sealed and having a control valve,
wherein the free jet working fluid leaving the second stage of the turbine exits the chamber through a draft chamber, the draft chamber having an outlet that is hydraulically sealed to an outlet fluid body, wherein movement of the free jet working fluid through an enclosed air space in the chamber entrains bubbles of the surrounding atmosphere, wherein momentum of free jet working fluid evacuates the entrained bubbles of the surrounding atmosphere from the chamber, and wherein the control valve is configured to allow an amount of air to enter the chamber to maintain a desired elevation of suction head inside the draft chamber without allowing the outlet fluid body to contact the plurality of blades.

18. A turbine system comprising:

a turbine comprising:
- a plurality of blades attached to a structure and traveling a path comprising a first stage substantially linear portion, a first substantially arc-shaped portion, a second stage substantially linear portion, and a second substantially arc-shaped portion;
- a plurality of stationary guide vanes arranged in a space enclosed by the structure; and
- a shroud positioned adjacent to the first substantially arc-shaped portion and conforming to a curvature of the first substantially arc-shaped portion, wherein each of the plurality of blades have a fixed orientation relative to a vector of blade travel, and wherein the plurality of blades are configured such that their curvature is asymmetric about the path of travel; and a confined flow nozzle having a rectangular cross-section, the confined flow nozzle being configured to provide a free jet working fluid to the turbine, the free jet working fluid having a flow pattern through the turbine in a plane substantially perpendicular to the first stage and the second stage.

19. A turbine system comprising:

a turbine comprising:
- a plurality of blades attached to a structure and traveling a path comprising a first stage substantially linear portion, a first substantially arc-shaped portion, a second stage substantially linear portion, and a second substantially arc-shaped portion;
- a plurality of stationary guide vanes arranged in a space enclosed by the structure; and
- a shroud positioned adjacent to the first substantially arc-shaped portion and conforming to a curvature of the first substantially arc-shaped portion;

a confined flow nozzle having a rectangular cross-section, the confined flow nozzle being configured to provide a free jet working fluid to the turbine, the free jet working fluid having a flow pattern through the turbine in a plane substantially perpendicular to the first stage and the second stage, wherein the confined flow nozzle comprises two opposing movable panels configured to vary a cross-sectional area of the free jet working fluid.

20. The turbine system of claim 19, wherein an orientation of the panels results in a free jet working fluid that varies substantially in its width, but whose cross-section is substantially unaltered;

wherein the free jet working fluid intersects the plurality of blades in substantially the same manner regardless of the width of the jet.

21. The turbine system of claim 19, wherein an orientation of the panels results in a free jet working fluid that substantially maintains its width, but whose cross-section height varies.

* * * * *